United States Patent
Fudge et al.

(10) Patent No.: US 8,401,050 B1
(45) Date of Patent: Mar. 19, 2013

(54) MULTIPLE PROJECTION SAMPLING FOR RF SAMPLING RECEIVERS

(75) Inventors: Gerald L. Fudge, Rockwall, TX (US); Scott M. Burkart, Royse City, TX (US); Antone L. Kusmanoff, Greenville, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 188 days.

(21) Appl. No.: 13/048,489

(22) Filed: Mar. 15, 2011

(51) Int. Cl.
*H04B 1/00* (2006.01)

(52) U.S. Cl. ........ 375/130; 375/140; 375/354; 375/355; 375/147

(58) Field of Classification Search ............ 375/316, 375/340, 354, 355, 147
See application file for complete search history.

(56) References Cited

U.S. PATENT DOCUMENTS

| | | | |
|---|---|---|---|
| 5,014,018 A | 5/1991 | Rodwell et al. | |
| 5,454,007 A | 9/1995 | Dutta | |
| 6,266,518 B1 | 7/2001 | Sorrells et al. | |
| 6,507,624 B1 | 1/2003 | Jachim et al. | |
| 6,574,459 B1 | 6/2003 | Kaminski et al. | |
| 6,639,537 B1 | 10/2003 | Raz | |
| 6,700,388 B1 | 3/2004 | Mayor et al. | |
| 6,900,710 B2 | 5/2005 | Agoston et al. | |
| 7,107,033 B2 | 9/2006 | du Toit | |
| 7,436,910 B2 | 10/2008 | Fudge et al. | |
| 7,436,911 B2 | 10/2008 | Fudge et al. | |
| 7,436,912 B2 | 10/2008 | Fudge et al. | |
| 7,489,745 B2 | 2/2009 | Fudge | |
| 2002/0161300 A1 | 10/2002 | Hoff et al. | |
| 2003/0016762 A1 | 1/2003 | Martin et al. | |
| 2003/0054783 A1 | 3/2003 | Mason et al. | |
| 2005/0069046 A1 | 3/2005 | Tsui et al. | |
| 2005/0117069 A1 | 6/2005 | McNeely | |
| 2006/0133470 A1 | 6/2006 | Raz et al. | |
| 2010/0189208 A1 | 7/2010 | Fudge et al. | |
| 2010/0202566 A1 | 8/2010 | Fudge et al. | |

FOREIGN PATENT DOCUMENTS

EP 1330036 A1 7/2003

OTHER PUBLICATIONS

Arthur, "Modern SAW-based pulse compression systems for radar applications, Part I: SAW matched filters," Electronics & Communication Engineering Journal, Dec. 1995, pp. 236-246.

Arthur, "Modern SAW-based pulse compression systems for radar applications, Part II: Practical systems," Electronics & Communication Engineering Journal, Apr. 1996, pp. 57-78.

Brandl et al., "High Speed Signal Processing with Tapped Dispersive SAW based Delay Lines," University of Technology, Applied Electronics Laboratory, Vienna Austria, IEEE 2000, pp. 171-176.

Burke, "Ultra-Linear Chirp Generation Via VCO Tuning Predistortion," AIL Systems, Inc., Deer Park, New York, IEEE 1994 MTT-S Digest, pp. 957-960.

(Continued)

*Primary Examiner* — Zewdu Kassa
(74) *Attorney, Agent, or Firm* — O'Keefe, Egan, Peterman & Enders LLP

(57) ABSTRACT

RF sampling receivers are disclosed that employ multiple sampling clocks to produce multiple projections. In operation, a Nyquist folded receiver (NYFR) may be implemented that utilizes at least one modulated sampling clock in combination with one or more other modulated or non-modulated sampling clocks to identify received signals. In such an embodiment, one or more clock modulations may be used to induce frequency modulations that are Nyquist zone dependent, and multiple Nyquist zones may be aliased together while still allowing for signals from different Nyquist zones to be separated and identified.

26 Claims, 14 Drawing Sheets

OTHER PUBLICATIONS

Gerard et al., "The Design and Applications of Highly Dispersive Acoustic Surface-Wave Filters," Invited Paper, IEEE Transactions on Microwave Theory and Techniques, vol. MTT-21, No. 4, Apr. 1973, pp. 176-186.
Ong et al., "Digital LPI Radar Detector," Naval Postgraduate School Thesis, Monterey, California, Mar. 2001, pp. 1-81.
Grant et al., "Recent Advances in Analog Signal Processing," IEEE 1990, IEEE Transactions on Aerospace and Electronic Systems, vol. 26, No. 5, Sep. 1990, pp. 818-849.
Li et al, "On the Use of a Compressive Receiver for Signal Detection," IEEE 1991, IEEE Transactions on Communications, vol. 39, No. 4, Apr. 1991, pp. 557-566.
Levy et al, "VCO Based Chirp Generation for Broad Bandwidth Compressive Receiver Applications," AIL Systems, Inc., Deer Park, New York, IEEE 1993 MTT-S Digest, pp. 1113-1115.
Lucyszyn, "Review of radio frequency microelectromechanical systems technology," Imperial College, London, IEE Proc.—Sci. Meas. Technol.vol. 151, No. 2, Mar. 2004, pp. 93-103.
Lyons et al., "High Temperature Superconductive Wideband Compressive Receivers," Analog Device Technology Group, Lincoln Laboratory, Invited Paper, IEEE Transactions on Microwave Theory and Techniques, vol. 44, No. 7, Jul. 1996, pp. 1258-1278.
Unser, "Sampling—50 Years After Shannon," Swiss Federal Institute of Technology, Lausanne, Switzerland, IEEE 2000 Proceedings of the IEEE, vol. 88, No. 4, Apr. 2000, pp. 569-587.
Sengupta et al, "Novel Ferroelectric Materials for Phased Array Antennas," U.S. Army Research Laboratory, Aberdeen Proving Groud, 1997 IEEE, IEEE Transactions on Ultrasonics, Ferroelectrics, and Frequency Control, vol. 44, No. 4, Jul. 1997, pp. 792-797.
Serhan et al., "Automatic Frequency Control Techniques for Microwave Active Filters," Limoges University, Limoges, France, 1997 IEEE MTT-S Digest, pp. 697-700.
Whittaker et al, "Digital chirp filter processing for improved performance of sweeping spectrum analysers," University of Surrey, Surrey, UK, Electronics Letters, Aug. 3, 2000, vol. 36, No. 16, pp. 1430-1432.
Agoston et al, "100 GHz Through-Line Sampler System with Sampling Rates in Excess of 10 G samples/second," Picosecond Pulse Labs, Boulder, Colorado, PSPL-100 Sampler Paper—Submitted to MTT 2003, http://www.picosecond.com->products->sampler modules, 3 pgs.
Akbari-Dilmaghani et al, "A High Q RF CMOS Differential Active Inductor," Imperial College, London, 1998 IEEE International Conference on Electronics, Circuits and Systems, vol. 3, Sep. 7-10, 1998, pp. 157-160.
Akos et al, "Direct Bandpass Sampling of Multiple Distinct RF Signals," 1999 IEEE Transactions on Communications, Vo. 47, No. 7, Jul. 1999, pp. 983-988.
Behbahani et al, "A Broad-Band Tunable CMOS Channel-Select Filter for a Low-IF Wireless Receiver," 2000 IEEE Journal of Solid-State Circuits, vol. 35, No. 4, Apr. 2000, pp. 476-489.
Brown et al, "Digital L-Band Receiver Architecture with Direct RF Sampling," NAVSYS Corp., Colorado Springs, Colorado, Position Location and Navigation Symposium, 1994, IEEE, Apr. 11-15, 1994, pp. 209-216.
Copeland et al, "5-GHz SiGe HBT Monolithic Radio Transceiver with Tunable Filtering," 2000 IEEE Transactions on Microwave Theory and Techniques, vol. 48, No. 2, Feb. 2000, pp. 170-181.
Deleniv et al, "Tunable Ferroelectric Filter-Phase Shifter," University of Technology, Gothenburg, Sweden, 2003 IEEE MTT-S Digest, pp. 1267-1270.
Juodawlkis et al, "Optical Down-Sampling of Wide-Band Microwave Signals," Invited Paper, Journal of Lightwave Technology, vol. 21, No. 12, Dec. 2003, pp. 3116-3124.
Karvonen et al, "A CMOS Quadrature Charge-Domain Sampling Circuit with 66-dB SFDR Up to 100 MHz," 2005 IEEE Transactions on Circuits and Systems—I: Regular Papers, vol. 52, No. 2, Feb. 2005, pp. 292-304.
Koc et al, "Direct RF Sampling Continuous-Time Bandpass /spl Delta/-/spl Sigma/A/D Converter Design for 3G Wireless Applications," ISCAS 2004, May 23-26, 2004, vol. I, pp. 409-412.
Latiri et al, "A reconfigurable RF sampling receiver for multistandard applications," Comptes Rendus Physique 7 (2006), pp. 785-793.
Lindfors et al, "A 3-V 230-MHz CMOS Decimation Subsampler," 2003 IEEE Transactions on Circuits and Systems—II: Analog and Digital Signal Processing, vol. 50. No. 3, Mar. 2003, pp. 105-117.
Loper, "A Tri-Phase Direct Conversion Receiver," Rockwell International, MILCOM 1990, Sep. 30-Oct. 3, 1990, pp. 1228-1232.
Luy et al, "Configurable RF Receiver Architecture," Daimler-Chrysler Research and Tecnology, Ulm, Germany, 2004 IEEE Microwave Magazine, Mar. 2004, pp. 75-82.
Minnis et al, "A Highly Digitized Multimode Receiver Architecture for 3G Mobiles," 2003 IEEE Transactions on Vehicular Technology, vol. 52, No. 3, May 2003, pp. 637-653.
Mirabbasi et al, "Classical and Modern Receiver Architectures," University of Toronto, 2000 IEEE Communications Magazine, Nov. 2000, pp. 132-139.
Mostafa et al, "WCDMA Receiver Architecture with Unique Frequency Plan," Micro Lnear Corp. San Jose, California and Texas Instruments, Inc., Dallas, Texas, ASIC/SOC Conference, 2001 Proceedings, $14^{th}$ Annual IEEE International, Sep. 12-15, 2001, pp. 57-61.
Muhammad et al, "Direct RF Sampling Mixer With Recursive Filtering in Charge Domain," Texas Instruments Incorporated, Dallas, Texas, ISCAS, May 23-26, 2004, vol. 1, pp. 577-580.
Namgoong et al., "Direct-Conversion RF Receiver Design," 2001 IEEE Transactions on Communications, vol. 49, No. 3, Mar. 2001, pp. 518-529.
Pellon, "RF-to-Digital Receivers Employing Bandpass Multibit /spl Sigma//spl Delta/ ADC Architectures," Lockheed Martin Government Electronic Systems, Morristown, New Jersey, $20^{th}$ Annual Gallium Arsenide Integrated Circuit (GaAs IC) Symposium, Nov. 1-4, 1998. pp. 11-14.
"Real-Time Sampling Downconverter Front Ends for Digital Radar and Wide-Bank Signaling," Picoscond Pulse Labs, 2500 $55^{th}$ Street, Boulder, CO 80301, (Nov. 2004).
Richter et al, "An Integrated Wideband-IF-Receiver Architecture for Mobile Terminals," Dresden University of Technology, Dresden, Germany, 2003 IEEE Radio Frequency Integrated Circuits Symposium, Jun. 8-10, 2003, pp. 583-586.
Shoji et al, "70-GHz-Band MMIC Transceiver With Integrated Antenna Diversity System: Application of Receive-Module-Arrayed Self-Heterodyne Technique," 2004 IEEE Transactions on Microwave Theory and Techniques, vol. 52, No. 11, Nov. 2004, pp. 2541-2549.
Springer et al, "RF System Concepts for Highly Integrated RFICs for W-CDMA Mobile Radio Terminals," 2002 IEEE Transactions on Microwave Theory and Techniques, vol. 50, No. 1, Jan. 2002, pp. 254-267.
Tatu et al, "Ka-Band Direct Digital Receiver," 2002 IEEE Transactions on Microwave Theory and Techniques, vol. 50, No. 11, Nov. 2002, pp. 2436-2442.
Tayebati et al, "Microelectromechanical tuneable filters with 0.47 nm linewidth and 70nm tuning range," Electonics Letters, Jan. 8, 1998, vol. 34, No. 1, pp. 76-78.
Thor et al, "A Direct RF Sampling Multifrequency GPS Receiver," Stanford University, Position Location and Navigation Symposium, 2002 IEEE, Apr. 15-18, 2002, pp. 44-51.
Tsui et al, "Digital Microwave Receiver Technology," Invited Paper, 2002 IEEE Transactions on Microwave Theory and Techniques, vol. 50, No. 3, Mar. 2002, pp. 699-705.
Valkama et al., "Advanced Receiver Architectures and I/Q Signal Processing," Tampere University of Technology, Tampere, Finland, First International Symposium on Control, Communications and Signal Processing, IEEE Jun. 2004, pp. 71-74.
Vaughan et al, "The Theory of Bandpass Sampling," 1991 IEEE Transactions on Signal Processing, vol. 39, No. 9, Sep. 1991, pp. 1973-1984.
Wooten et al, "Rapidly Tunable Narrowband Wavelength Filter Using LiNbO3 Unbalanced Mach-Zehnder Interferometers," Journal of Lightwave Technology, vol. 14, No. 11, Nov. 1996, pp. 2530-2536.

Pepper et al, "NLTLs Push Sampler Products Past 100 GHz," Microwaves & RF, Oct. 2005, 6 pgs.

Model 7620 DCSM VME Card Datasheet, Revision C, Picosecond Pulse Labs, Boulder, Colorado, Sep. 2005, 10 pgs.

Wepman, "Analog-to-Digital Converters and Their Applications in Radio Receivers," 1995 IEEE Communications Magazine, May 1995, pp. 39-45.

U.S. Appl. No. 60/373,163, filed Apr. 17, 2002, "Tunable modules for frequency agile receivers."

Brueller et al, "On Non-uniform Sampling of Signals," Israel Institute of Technology, Haifa, Israel, ISIE, Jul. 7-10, 1998, pp. 249-252.

Candes et al, "Robust Uncertainty Principles: Exact Signal Reconstruction From Highly Incomplete Frequency Information," 2006 IEEE Transactions on Information Theory, Vo. 52, No. 2, Feb. 2006, pp. 489-509.

Donoho, "Compressed Sensing," 2006 IEEE Transactions on Information Theory, vol. 52, No. 4., Apr. 2006, pp. 1289-1306.

Dragotti et al, "Exact Sampling Results for Signals with Finite Rate of Innovation Using Strang-Fix Conditions and Local Kernels," ICASSP 2005, Mar. 18-23, 2005, pp. 233-236.

Dragotti et al, "Wavelet Footprints: Theory, Algorithms, and Applications," 2003 IEEE Transactions on Signal Processing, vol. 51, No. 5, May 2003, pp. 1306-1323.

Duarte et al, "Distributed Compressed Sensing of Jointly Sparse Signals," Rice University, Houston, Texas, Asilomar Conference on Signals, Systems and Computers 2005, Oct. 28-Nov. 1, 2005, pp. 1537-1541.

Gansman et al, "Single Frequency Estimation with Non-uniform Sampling," Asilomar Conference on Signals, Systems and Computers 1996, Nov. 3-6, 1996, vol. 1., pp. 399-403.

Herley et al, "Minimum Rate Sampling and Reconstruction of Signals with Arbitrary Frequency Support," 1999 IEEE Transactions on Information Theory, vol. 45, No. 5, Jul. 1999, pp. 1555-1564.

Kumar et al, "On Distributed Sampling of Bandlimited and Non-Bandlimited Sensor Fields," University of California, Berkeley, California, ICASSP 2004, May 17-21, 2004 vol. III., pp. 925-928.

Lefkaditis et al., Ambiguities in the harmonic retrieval problem using non-uniform sampling, IEE Proceedings—Radar, Sonar and Navigation, Dec. 2001, pp. 325-329.

Maravic et al, "Channel Estimation and Synchronization with Sub-Nyquist Sampling and Application to Ultra-Wideband Systems," ISCAS 2004, May 23-26, 2004, pp. V-381-V-384.

Maravic et al, "Sampling and Reconstruction of Signals With Finite Rate of Innovation in the Presence of Noise," 2005 IEEE Transactions on Signal Processing, vol. 53, No. 8, Aug. 2005, pp. 2788-2805.

Pace et al, "Use of the Symmetrical Number System in Resolving Single-Frequency Undersampling Aliases," 1997 IEEE Transactions on Signal Processing, vol. 45, No. 5, May 1997, pp. 1153-1160.

Sanderson et al, "Reduction of Aliasing Ambiguities Through Phase Relations," 1992 IEEE Transactions on Aerospace and Electronic Systems, vol. 28, No. 4, Oct. 1992, pp. 950-956.

Sayiner et al, "A Non-Uniform Sampling Technique for A/D Conversion," ISCAS 193, May 3-6, 1993, pp. 1220-1223.

Styer et al, "Two Channel RSNS Dynamic Range," 2002 IEEE Transactions on Circuits and Systems—I: Fundamental Theory and Applications, vol. 49, No. 3., Mar. 2002, pp. 395-397.

Vetterli et al, "Sampling Signals With Finite Rate of Innovation," 2002 IEEE Transactions on Signal Processing, vol. 50, No. 6, Jun. 2002, pp. 1417-1428.

Walter, "Non-Uniform Sampling in Wavelet Subspaces," University of Wisconsin, Milwaukee, Wisconsin, ICASSP 1999, pp. 2057-2059.

Xia, "An Efficient Frequency-Determination Algorithm from Multiple Undersampled Waveforms," 2000 IEEE Transactions on Signal Processing Letters, vol. 7, No. 2, Feb. 2000, pp. 34-37.

Xiong et al, "A Non-uniform Sampling Tangent Type FM Demodulation," 2004 IEEE Transactions on Consumer Electronics, vol. 50, No. 3., Aug. 2004, pp. 844-848.

Zhu et al, "Adaptive Non-Uniform Sampling Delta Modulation for Audio/Image Processing," 1996 IEEE Transactions on Consumer Electronics, vol. 42, No. 4, Nov. 1996, pp. 1062-1072.

Weller et al., "Jitter Compensation in Sampling Via Polynomial Least Squares Estimation", 2009, 4 pgs.

Weller et al., "Nonlinear Digital Post-Processing to Mitigate Jitter in Sampling", Sep. 2008, 24 pgs.

Fudge et al., "System and Method for Clock Jitter Compensation in Direct RF Receiver Architectures", U.S. Appl. No. 61/203,114, filed Dec. 18, 2008; 10 pgs.

Fudge et al., "System and Method for Improved Spur Reduction in Direct RF Receiver Architectures", U.S. Appl. No. 61/203,115, filed Dec. 18, 2008; 17 pgs.

Tarczynski et al., "Optimal Periodic Sampling Sequences for Nearly-Alias Free Digital Signal Processing", IEEE, 2005, 4 pgs.

Artyukh et al., "Wideband RF Signal Digitising for High Pruity Spectral Analysis", International Workshop on Spectral Methods and Multirate Signal Processing, Jun. 2005, 6 pgs.

MULTIPLE PROJECTION SAMPLING FOR RF SAMPLING RECEIVERS

TECHNICAL FIELD OF THE INVENTION

This invention relates to receiver architectures, and more particularly to receiver architectures for sampling of RF signals.

BACKGROUND

A wide variety of signals and related protocols exist for the use of radio frequency (RF) signals in communication systems and other devices, such as radar systems. Prior receiver architectures for such RF communication systems are described in U.S. Pat. No. 7,436,910, entitled "DIRECT BANDPASS SAMPLING RECEIVERS WITH ANALOG INTERPOLATION FILTERS AND RELATED METHODS," and U.S. Pat. No. 7,436,912, entitled "NYQUIST FOLDED BANDPASS SAMPLING RECEIVERS AND RELATED METHODS."

FIG. 1 (Prior Art) shows an embodiment for a reconfigurable direct RF bandpass sampling receiver (RDRFBSR), such as those described in U.S. Pat. No. 7,436,910. As depicted, the radio frequency (RF) input signal 116 is first passed through a low noise amplifier (LNA) 102. The output 130 of the LNA 102 is provided to a tunable/switchable bandpass filter 104, which can be configured to have a tunable center frequency and a programmable bandwidth dependent upon one or more filter control signals 105. The filtered output signal 132 is received by the non-quantizing sampler 204, which samples the signals at times determined by the RF sample clock 212 resulting in a discrete time continuous voltage sampled signal. The sampled signal is then filtered by the interpolation filter, resulting in a continuous time continuous voltage signal, which is then sampled and quantized by the analog to digital converter (ADC) 210 at sample rate determined by the ADC Sample Clock 214 after optional amplification by the IF amp 208. The digital output signals from the ADC 210 are then further processed by digital signal processing (DSP) circuitry 114 to produce baseband in-phase path (I) and quadrature path (Q) signals.

FIG. 2 (Prior Art) shows an embodiment of a Nyquist folding receiver (NYFR) 300, such as those described in U.S. Pat. No. 7,436,912. The NYFR is similar to the RDRFBSR. Starting with the RDRFBSR, the anti-alias filter is replaced with a wideband pre-select filter, and the constant RF sample clock is replaced with a frequency modulated sample clock that generates sample times at the zero-crossing rising voltage of a frequency modulated clock. In FIG. 2, an ultra wideband (UWB) front end filter 302 is present in front of a non-quantizing RF sampler 204 to allow reception of multiple Nyquist zones. The non-quantizing RF sampler 204 uses modulated RF sample clock circuitry 304, and is followed by an analog interpolation filter 206 and an ADC 210. The ADC 210 receives an ADC sampling clock signal 214 from ADC clock circuitry. The wideband filter 302 has a bandwidth that is wide enough to pass multiple Nyquist zones where the Nyquist zones are determined by the RF sampling clock frequency for the non-quantizing RF sampler 204. The modulated sample clock circuitry 304 provides an RF sampling clock signal to the non-quantizing RF sampler 204 that is not constant and is adjusted or modulated during sampling.

FIG. 3 (Prior Art) shows the input/output characteristics of the NYFR. In particular, an input signal has an induced modulation $M\Theta(t)$, where $\Theta(t)$ is the phase modulation of the RF sample clock and M depends on the Nyquist zone in which the signal originated. Thus, a broadband RF input can be sampled at far less than Nyquist, allowing individual signals from different Nyquist zones to alias (or fold) into the analog interpolation filter. The original RF frequency from which each signal aliased can then be determined without ambiguity by measuring M.

FIG. 4 (Prior Art) illustrates the principles of the NYFR via a frequency domain example. The Fourier transform of the pulse train, shown in the right side of FIG. 4 (Prior Art), is convolved with the input spectra after the wideband RF filter, which is shown at top left. It is noted that the Fourier transform of the pulse train consists of a series of impulse-like signals with increasing width. For example, the width at 0 $f_{S1}$ is 0; the width at 1 $f_{S1}$ is the modulation bandwidth; the width at 2 $f_{S1}$ is 2× the modulation bandwidth; etc. When these are convolved with the input spectra, the resulting spectra has modulation bandwidth corresponding to Nyquist zone of origin as shown in the lower left hand side of FIG. 4 (Prior Art). It is noted that the numbers on the left side of FIG. 4 (Prior Art) correlate to the numbers in FIG. 2 (Prior Art) and show the positions within the circuitry where the signals in FIG. 4 (Prior Art) are present.

SUMMARY OF THE INVENTION

In the practice of the disclosed systems and methods, RF sampling receivers may be provided that employ multiple sampling clocks to produce multiple projections. In one embodiment, the disclosed systems and methods may be implemented to provide a Nyquist folded receiver (NYFR) that utilizes at least one modulated sampling clock in simultaneous combination with one or more other modulated or non-modulated sampling clocks to identify received signals. In such an embodiment, one or more clock modulations may be used to induce frequency modulations that are Nyquist zone dependent, and multiple Nyquist zones may be aliased together while still allowing for signals from different Nyquist zones to be separated and identified. In particular, a NYFR may be implemented that employs multiple simultaneous sampling clocks to produce multiple projections of the same data simultaneously to improve estimated or reconstructed data over conventional NYFR performance, e.g., to yield significantly improved frequency estimates for wide bandwidth signals. For example, in one exemplary embodiment a Nyquist folded receiver (NYFR) may be implemented with multiple different RF sampling clocks (e.g., one modulated sampling clock and one uniform sampling clock) and with appropriately chosen uniform clocks to avoid frequency resolution ambiguity while at the same time remaining significantly under-sampled. Advantageously, multiple projections may be simultaneously achieved using multiple clocks provided in the same signal processing path or channel for RF sampling in the NYFR architecture (e.g., while still using a single ADC), providing significant hardware savings and power savings over a full dual NYFR (or multi-NYFR) receiver system while achieving similar performance improvement in sparse environments. Thus, using the disclosed systems and methods, multiple clocks may be simultaneously employed to achieve multiple simultaneous signal projections with very little extra hardware and with very little extra digital signal processing (DSP) required, while keeping a single ADC at a uniform sample rate. The disclosed systems and methods may be advantageously implemented for applications including, but not limited to, wideband RF surveillance and cognitive radio.

In one exemplary embodiment, at least two simultaneous clocks may be added together for RF sampling to generate at least two images. For example, one of the clocks may employ a modulated FM signal and the other clock be a fixed CW carrier, although other combinations of multiple clocks may be employed. For a combination of two such clocks two images should be generated, i.e., a modulated FM output and a CW tone output. The multiple clocks may be added directly into a single sampler, or multiple clocks may be added separately, i.e., using multiple samplers and adding the outputs of the samplers. In one embodiment where sampler outputs are added together, additional information may be obtained by comparing image amplitudes when the samplers have different magnitude responses, e.g., for images with small modulation that is relative difficult to measure, magnitudes of the images may be compared to determine which clock generated which image.

In one respect, disclosed herein is receive path circuitry for a sampling receiver having folded Nyquist zones. The receive path circuitry may include multiple sampling clocks and sampling circuitry. The multiple sampling clocks may each be configured to produce a respective sampling clock signal, at least one of the multiple sampling clocks being a modulated sampling clock configured to produce a modulated sampling clock signal that has a center frequency that is different from the center frequency of a sampling clock signal produced by at least one other of the multiple sampling clocks. The sampling circuitry may have a sampling circuit input configured to receive input signals within a bandwidth wide enough to cover multiple Nyquist zones associated with the modulated sampling clock, the sampling circuitry configured to receive the input signals and to receive each of the sampling clock signals from the multiple sampling clocks, each of the sampling clock signals being configured to provide sampling for the input signals within the multiple Nyquist zones to produce a separate and different image corresponding to each input signal, and the modulated sampling clock signal being configured to provide non-uniform sampling for signals within the multiple Nyquist zones to induce frequency modulation on signals dependent on a Nyquist zone of origin. The sampling circuitry may be configured with a sampling circuitry output configured to produce a sampling circuitry output signal that includes the multiple different images generated by sampling each input signal using each of the multiple sampling clock signals, the multiple different images including at least one first image and at least one second image corresponding to each input signal.

In another respect, disclosed herein is a method for bandpass sampling of signals using folded Nyquist zones. The method may include providing sampling circuitry; generating multiple sampling clock signals for sampling within the multiple Nyquist zones, at least one of the generated multiple sampling clock signals being a modulated sampling clock signal that has a center frequency that is different from the center frequency of another one of the generated sampling clock signals; utilizing sampling circuitry to sample input signals within the multiple Nyquist zones with each of the sampling clock signals to produce multiple different images corresponding to each of the input signals, the modulated sampling clock providing non-uniform sampling for signals within the multiple Nyquist zones to induce frequency modulation on the signals dependent on a Nyquist zone of origin; and producing an output signal from the sampling circuitry that includes the multiple different images generated by sampling each of the input signals using each of the multiple sampling clock signals, the multiple different images including at least one first image and at least one second image corresponding to each input signal.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

In certain embodiments of the disclosed systems and methods, Nyquist folded sampling receivers may be implemented to use multiple simultaneous sampling clocks to identify received signals. By using a sample clock modulation to induce frequency modulations that are Nyquist zone dependent in simultaneous combination with at least one other additional modulated or non-modulated sampling clock, multiple Nyquist zones may be aliased together while still allowing for signals from different Nyquist zones to be separated and identified, even under conditions where induced sampling modulations are relatively difficult to ascertain, e.g., such as for wideband modulated signals.

Figure 1:
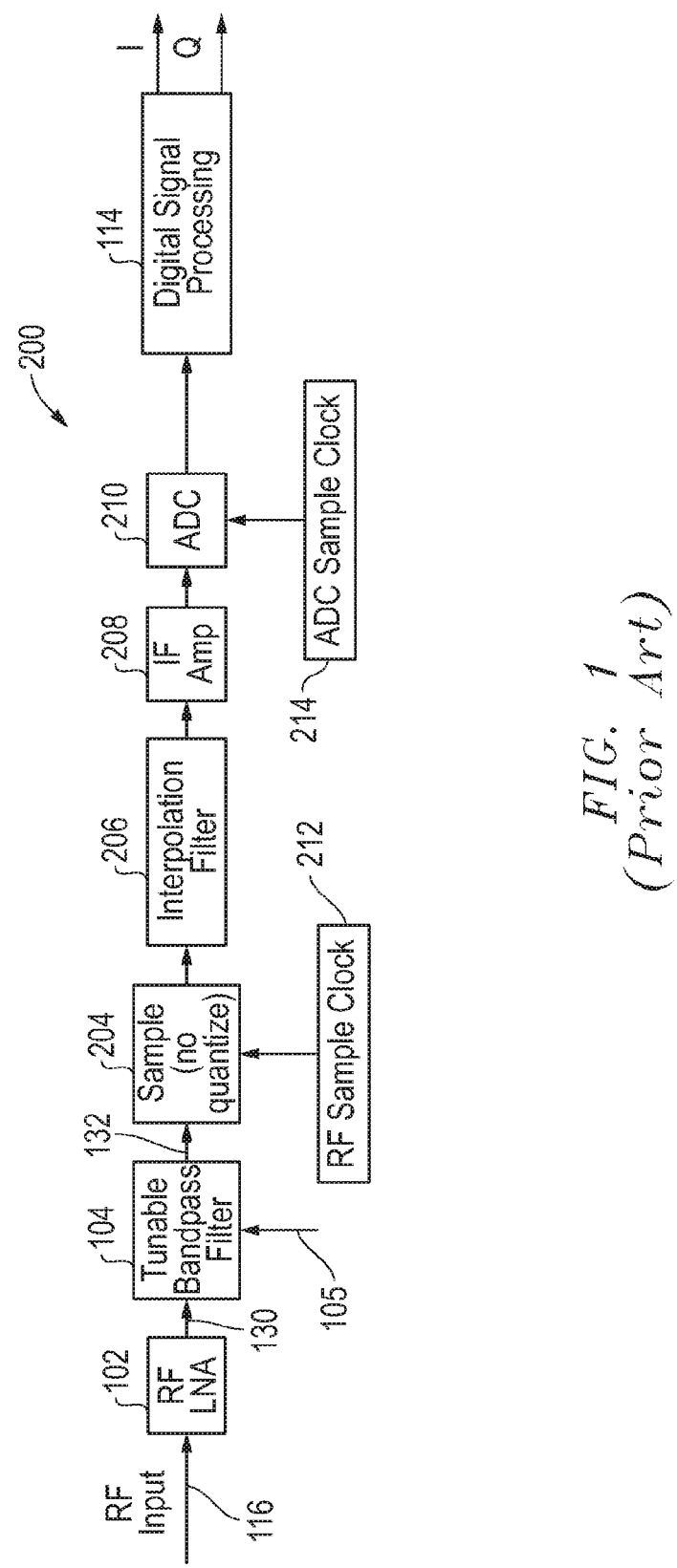
FIG. 1 (Prior Art) is a block diagram for a reconfigurable direct RF bandpass sampling receiver (RDRFBSR).
Figure 2:
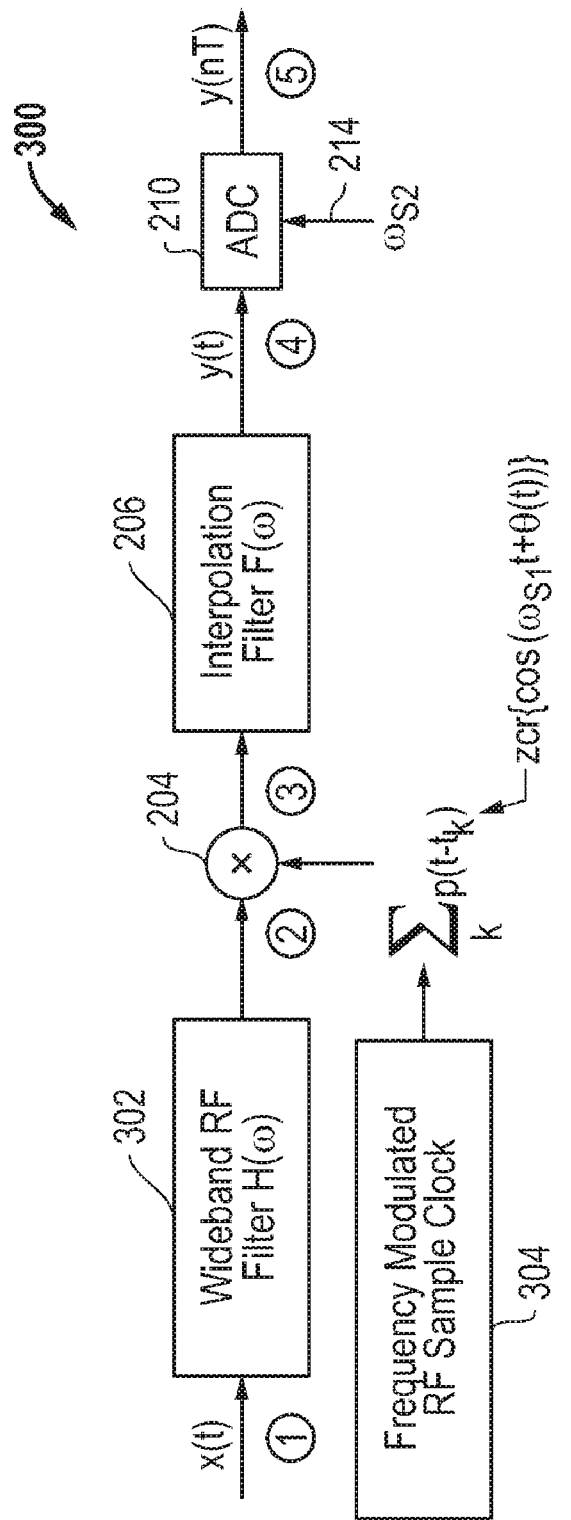
FIG. 2 (Prior Art) is a block diagram for a Nyquist folding receiver (NYFR).
Figure 3:
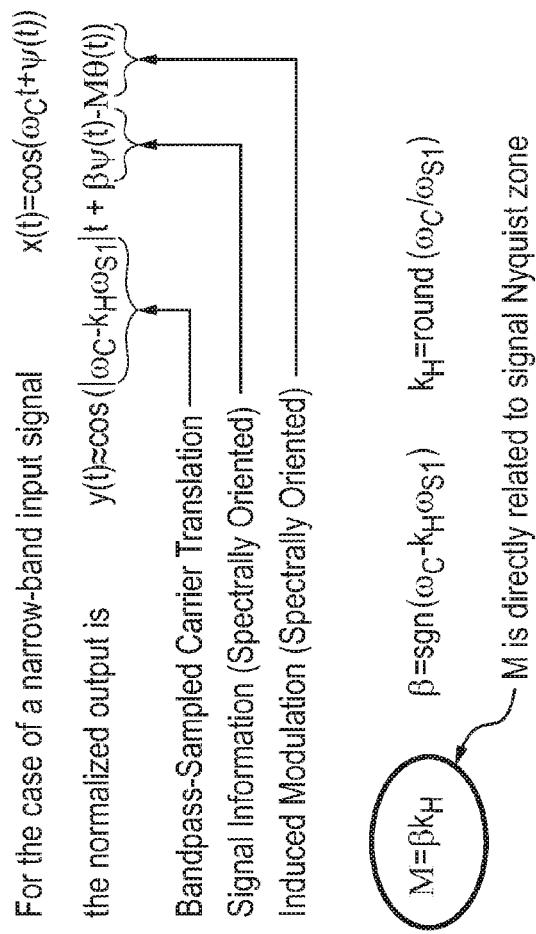
FIG. 3 (Prior Art) provides an explanation of mathematical expressions associated with the NYFR signals.
Figure 4:
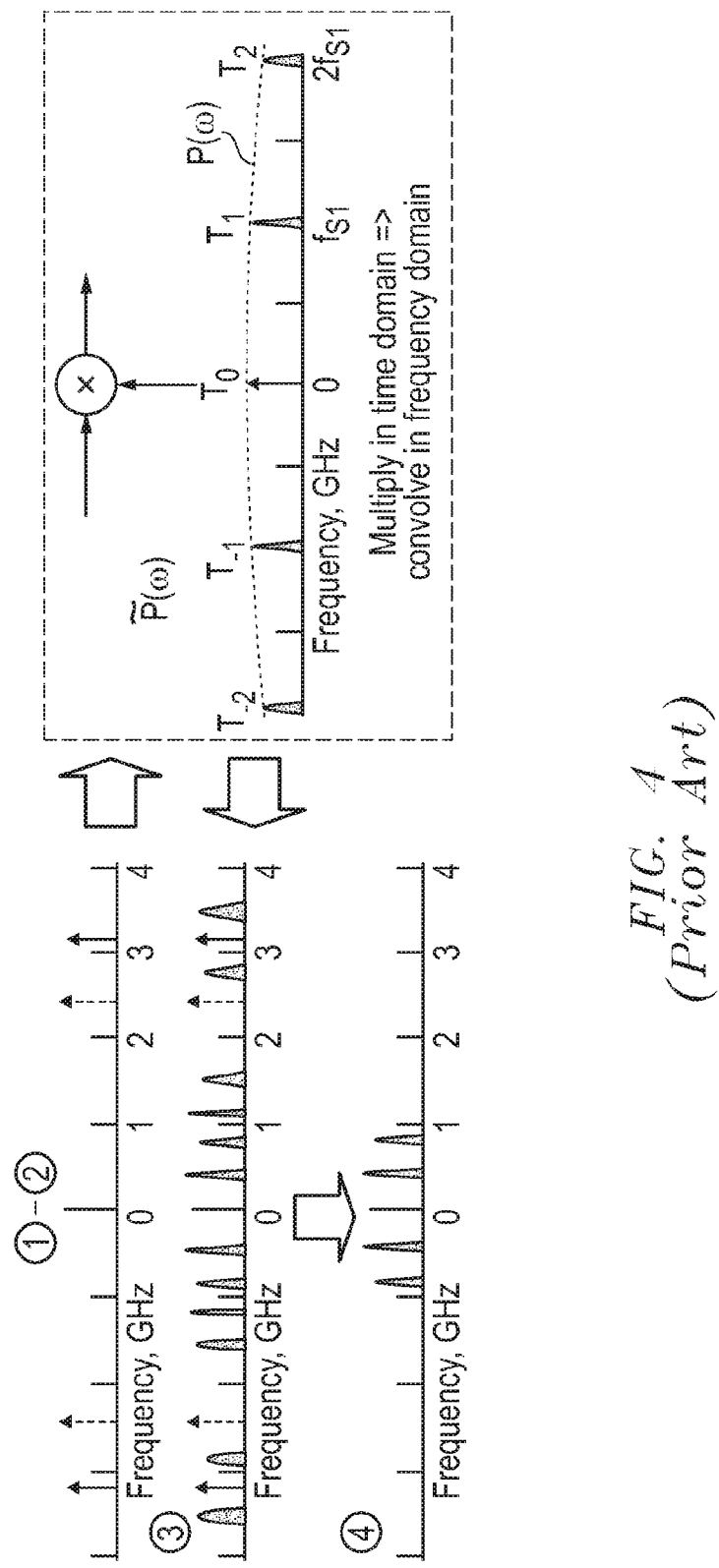
FIG. 4 (Prior Art) is a signal diagram for signal processing provided by the NYFR of FIG. 2.
Figure 5:
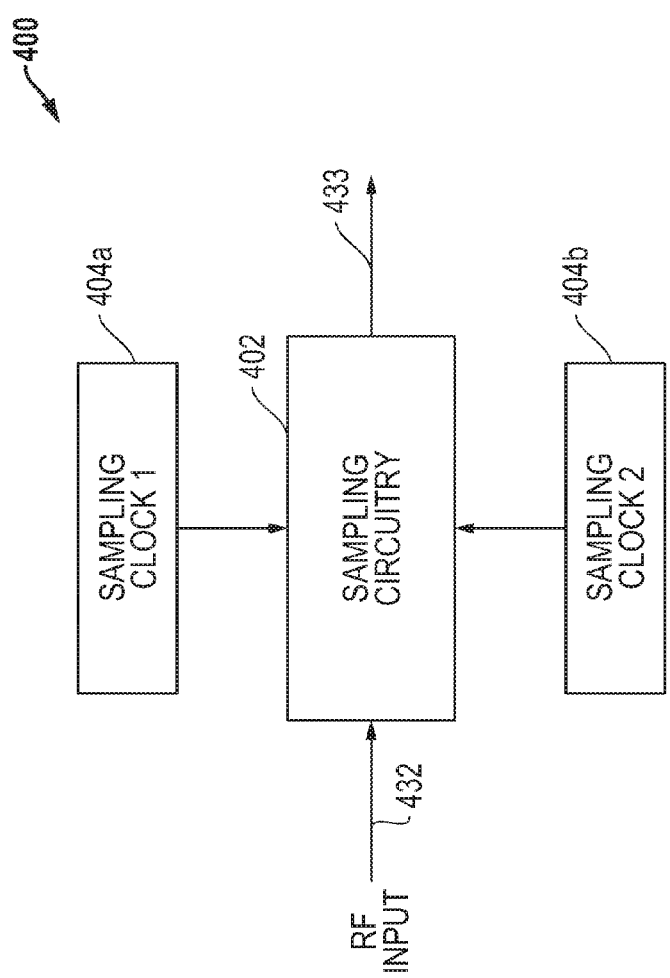
FIG. 5 is a block diagram of a multiple clock RF receiver sampling system architecture according to one exemplary embodiment of the disclosed systems and methods.

FIG. 5 illustrates a multiple clock RF receiver sampling system architecture 400 according to one embodiment of the disclosed systems and methods. As shown in FIG. 5, sampling circuitry 402 of system 400 receives a RF input 432 which may be filtered to a bandwidth selected to fit the complexity or density of the given signal environment. Sampling circuitry 402 also receives multiple sampling clock input signals, each at a desired frequency, simultaneously from multiple sampling clocks 404a and 404b. The sampling clock signals from each of clocks 404a and 404b determines the sampling frequencies for the sampling circuitry 402. In this embodiment, the simultaneous signals from clocks 404a and 404b are processed together in the sampling circuitry 402 to generate at least two images in sampling output signal 433. Although two sampling clocks 404a and 404b are illustrated for this embodiment, it is also possible that three or more sampling clocks 404 may be employed in a similar manner using the techniques described herein.

It will be understood that modulation patterns on the separate sampling clocks 404 may not necessarily be the same, and in some embodiments at least one sampling clock 404 may be non-modulated to simplify processing, although each sampling clock may be modulated in other embodiments. It will also be understood that center frequencies of each RF sample clock 404 may be different to minimize spectral overlap. In the context of compressive sensing (CS), this allows multiple projections using different projection matrices of the same data with a single ADC for some embodiments. Moreover, by directly adding together sampling clock signals from multiple clock circuits prior to sampling, a single Nyquist folding receiver signal processing path or channel may be implemented.

It will be understood that sampling circuitry 402 may be provided as part of a RF sampling receiver system that is configured in any manner suitable for simultaneously sampling RF data utilizing separate multiple clock signals to provide multiple corresponding images from a RF input signal. Examples of suitable RF sampling architectures having sampling circuitry which may be modified and implemented in combination with the disclosed systems and methods are described in U.S. Pat. Nos. 7,489,745, 7,436,910, 7,436,911 and 7,436,912, each of which is incorporated herein by reference in its entirety. As described in one or more of these references, a modulated RF sampling clock signal may be employed to produce non-uniform sampling such that the instantaneous frequencies obtained for different received signals will appear with a particular signature (e.g., each with a different frequency slope). Thus, even though Nyquist zones may fold on top of each other, different signals from different Nyquist zones can be separated and identified based on the fact that the added modulation is different for each Nyquist zone. As such, the slope of each sampled signal can be measured, and the original Nyquist zone from which each signal originated can determined even though these two signals will have been folded together during sampling. It is also noted that signals from odd-numbered Nyquist zones (1st, 3rd, etc.) will have opposite induced modulation slope than signals from even-numbered Nyquist zones. This use of clock modulations to provide non-uniform sampling and to induce frequency modulations that are Nyquist zone dependent allows multiple Nyquist zones to be aliased together while still allowing for signals from different Nyquist zones to be separated and identified.

This non-uniform sampling allows for the frequency modulations generated by sampling to be different in different Nyquist zones. As such, a single clock modulation, or multiple clock modulations, mathematically translate into different signal modulations depending upon the Nyquist zone in which the signals are located before being folded together thereby allowing separation of the aliased signals and determination of the Nyquist zone from which they came. It is further noted that a modulated sampling clock may be tunable or switchable such that the frequency of the clock signal may be tuned to a desired frequency and/or one of a plurality of generated clock signals may be selected. In addition, a modulated sampling clock may be configured such that the modulation for the modulated sampling clock is adjustable during operation of the receiver. Other variations and implementations could also be utilized, if desired.

For example, a shallow linear chirp can be produced by a RF sampling clock 404 to generate non-uniform sampling. Assuming the shallow linear chirp varies the sampling clock according to a slope X, signals in the Nth Nyquist zone will have induced slope magnitude given by X*ceiling(N/2) when they are uniformly re-sampled, and the slope direction will be alternating for adjacent Nyquist zones because of spectral reversal. Assuming, for example, an input bandwidth of between DC (0 GHz) to about 20 GHz and sampling occurs at 2 Giga-samples per second (Gsps) for a plurality of relatively sparse on-off key (OOK) input signals, twenty Nyquist zones will be aliased into each other during sampling, and a measurement of the chirp slope during each on-segment may be used to determine from which Nyquist zone the signal originated. The baseband Nyquist zone covering DC to about 1 GHz will have no induced slope. The first Nyquist zone covering about 1 GHz to about 2 GHz will have induced slope=X. The second Nyquist zone covering about 2 GHz to about 3 GHz will have induced slope=−X. The third Nyquist zone covering about 3 GHz to about 4 GHz will have induced slope=2×, and so on. The ability to make this determination, however, will typically rely upon the signal density being fairly low. It is noted that the signal inputs are not restricted to OOK and that OOK signals are used in the above example to simplify the discussion. Further information on use of a modulated sampling clock for non-uniform sampling may be found described in U.S. Pat. Nos. 7,436,911 and 7,436,912, each of which is incorporated herein by reference in its entirety.

However, in some instances, induced modulation may be difficult to measure for images created by sampling an input signal with a modulated clock, such as using techniques described in the above listed patents, e.g., due to relatively small induced modulation frequency changes when sampling a much wider bandwidth input signal caused by modulation on the signal and/or due to very short signal duration (e.g., such as ultra wideband (UWB) impulse radio (UWB-IR) signals). In one example, a signal may have a bandwidth of more than 10× the sample clock bandwidth. This may make it more difficult to determine the identity of the correct Nyquist zone that corresponds to a signal of interest, when signals from multiple Nyquist zones have been folded together. The disclosed multiple clock sampling systems and methods may be implemented under these conditions to identify the identity of the correct Nyquist zone that corresponds to a signal of interest.

Thus, using the embodiment of FIG. 5, multiple separate sampling clock signals may be simultaneously provided for simultaneously sampling RF input 432, and at least one of clocks 404a and 404b may provide a modulated FM signal. In one exemplary embodiment one of clocks 404a and 404b may provide a modulated FM signal, and the other clock may provide a fixed continuous wave (CW) carrier (to generate a modulated FM output and a CW tone output). In any case, it is noted that at least one modulated clock signal may be configured as desired to generate non-uniform sampling. For example, a chirp frequency modulated RF sampling clock signal may be used, and the chirp may be based upon a linear sawtooth modulation (sometimes referred to as a linear chirp), a sinusoidal modulation (sometimes referred to as sinusoidal frequency chirp), a triangle frequency modulation (sometimes called a triangle chirp), and/or any other desired chirp modulation scheme. Other modulated clock signals and combinations of modulations may also be used to provide non-uniform sampling, including frequency shift key, frequency agile, phase shift, general frequency modulation, etc. One combination that may be used is a triangle frequency modulation combined with an FSK (frequency shift key) modulation. It is also noted that the clock modulation of a given sample clock 404 may be switchable as described further below, or it may be otherwise reconfigurable. For example, it may be advantageous to change the clock modulation from one type of modulation to another type of modulation in order to improve the performance against different classes of signals.

Figure 6:
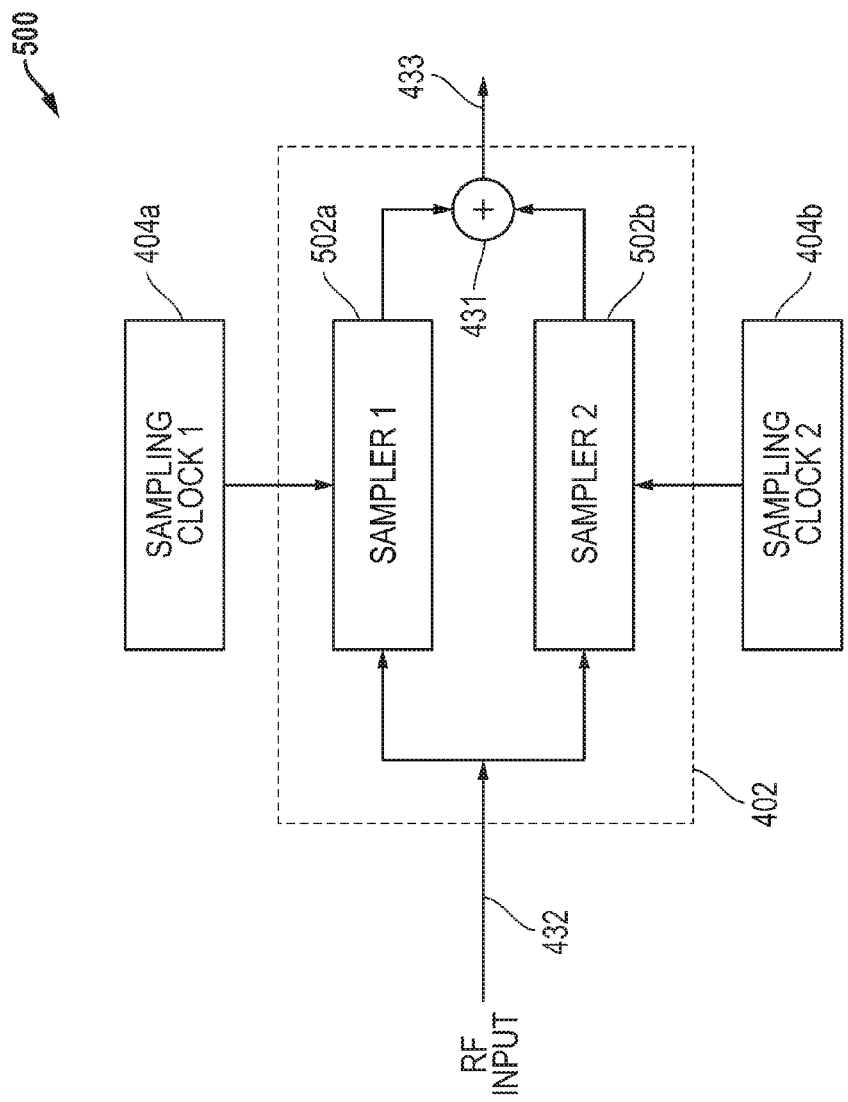
FIG. 6 is a block diagram of a multiple clock RF receiver sampling system architecture according to one exemplary embodiment of the disclosed systems and methods.
Figure 7:
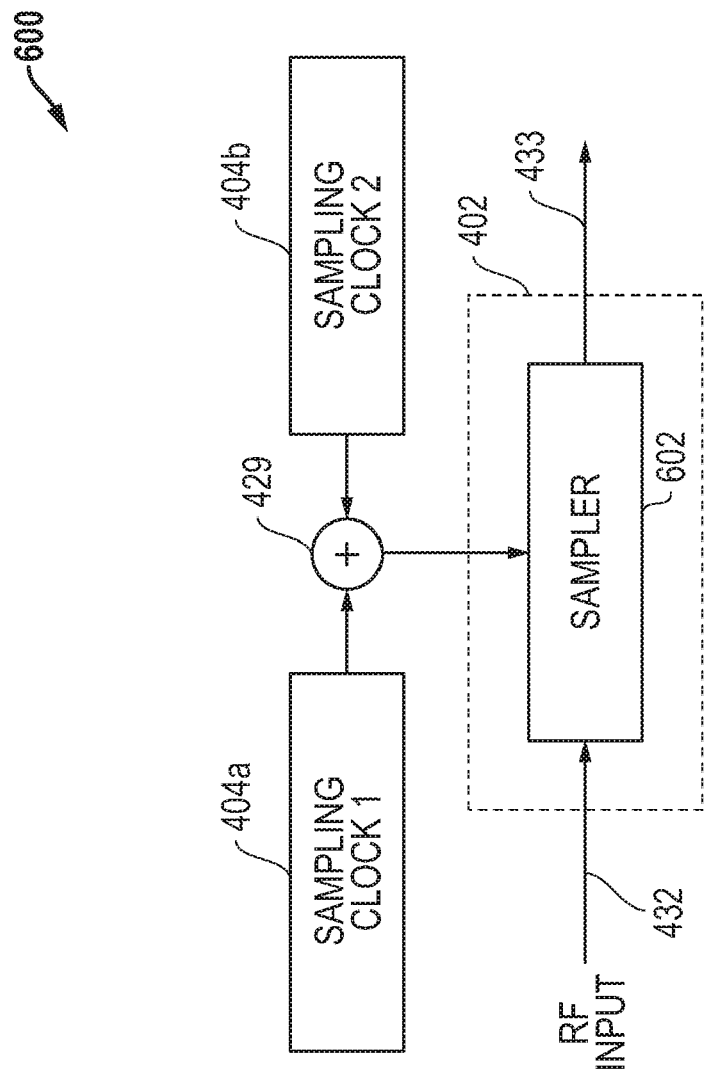
FIG. 7 is a block diagram of a multiple clock RF receiver sampling system architecture according to one exemplary embodiment of the disclosed systems and methods.

Returning to FIG. 5, sampling circuitry 402 may be implemented in any manner suitable for using the sampling clock signals from multiple clocks 404a and 404b to produce multiple different projections of the same data from RF input signal 432. For example, multiple clocks 404a and 404b may be added together into a single sampler provided in sampling circuitry 402, or multiple clocks 404a and 404b may each be provided to a separate and independent sampler provided in sampling circuitry 402 and the output of the two samplers added together. FIG. 6 illustrates one exemplary embodiment of a multiple clock RF receiver sampling system architecture 500 in which sampling circuitry 402 includes multiple samplers 502a and 502b that correspond to respective sampling clocks 404a and 404b. Sampling clocks 404a and 404b simultaneously provide sampling clock signals to sampling circuitry 402. As shown in FIG. 6, multiple samplers 502a and 502b of sampling circuitry 402 each receives RF input 432 and samples data according to a clock signal from one of sampling clocks 502a and 502b, respectively. In this embodiment, the sampled data from each of samplers 502 and 502b is then added together by adder circuitry 431 as shown to generate an output signal 433 that includes at least two images for further processing. FIG. 7 illustrates another exemplary embodiment of a multiple clock RF receiver sampling system architecture 600 in which simultaneously-provided clock samples from each of sampling clocks 404a and 404b is added together by adder circuitry 429 to produce a combined clock signal which is then provided to a common sampler 602 of sampling circuitry 402. Sampler 602 samples data from RF input 432 according to the combined clock signals from sampling clocks 404a and 404b to generate an output signal 433 that includes at least two images for further processing.

Figure 8:
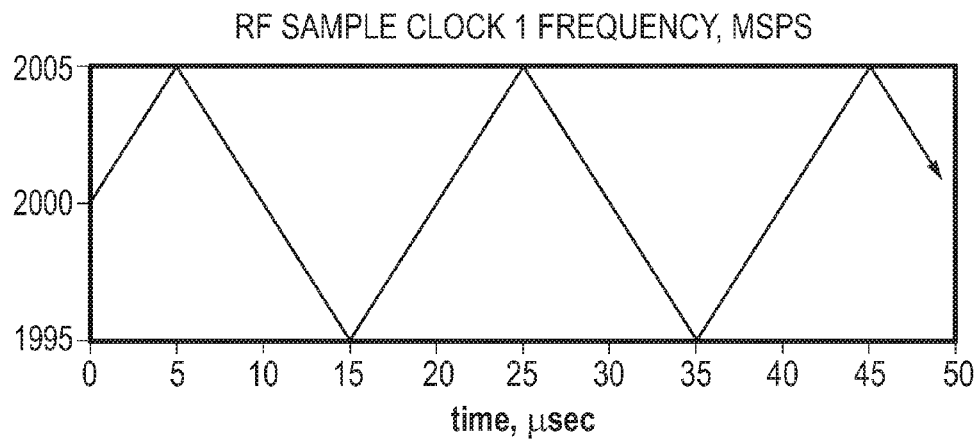
FIG. 8 is signal diagram for a modulated RF sampling clock according to one exemplary embodiment of the disclosed systems and methods.
Figure 9:
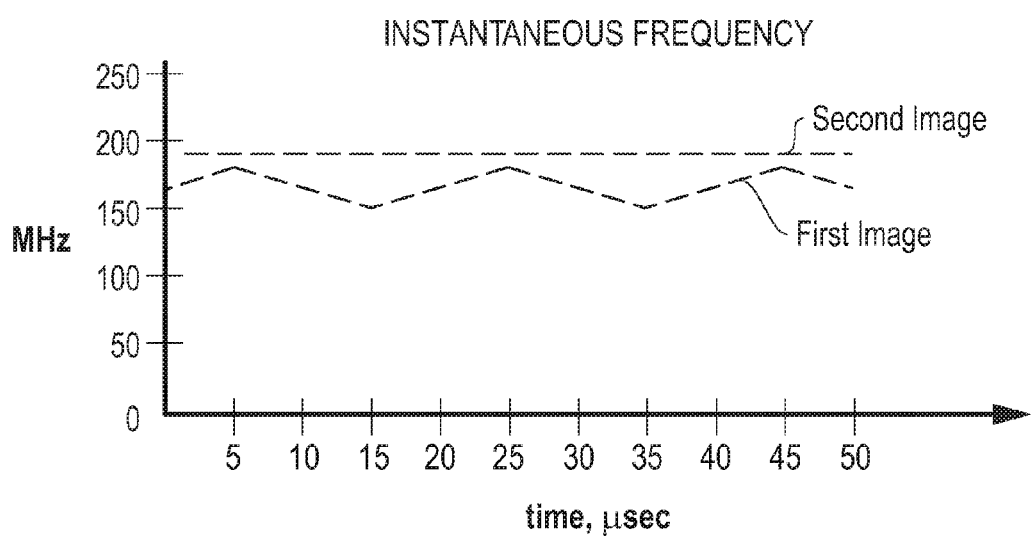
FIG. 9 is a spectrogram according to one exemplary embodiment of the disclosed systems and methods.

To illustrate a combination of modulated and non-modulated sampling clock signals from two sampling clocks of FIG. 5, one sampling clock 404a may be a typical FM modulated signal centered at about 2 giga-samples per second (Gsps), e.g., 10 MHz peak-peak frequency deviation in a triangle modulation pattern with period 20 µsec as shown in FIG. 8. The other sampling clock 404b may be a fixed continuous wave (CW) carrier, e.g., at 1.98 Gsps. Rather than treating this as a single RF sample clock with an average sample rate of almost 4 Gsps, the system may be treated as having two independent clocks, each with a Nyquist zone bandwidth of about 1 GHz (more or less). Thus, for one input signal 432, multiple clock RF receiver sampling system architecture 400 produces two images as shown in FIG. 9, with each image corresponding to one of sampling clocks 404a or 404b. Thus, assuming an input signal 432 has an input tone at 2155 MHz (in the second Nyquist zone), a first image that is a modulated FM output centered at an IF of 155 MHz with a bandwidth of 10 MHz (i.e., modulating between 150 and 160 MHz) will be produced as shown in FIG. 9 by sampling circuitry 402 due to the clock signal of sampling clock 404a. A second image in the form of a CW tone output at 175 MHz as also shown in FIG. 9 will also be obtained from sampling circuitry 402 due to the CW clock signal of sampling clock 404b.

In another illustrative example, the above-described modulated and non-modulated sampling clock signals from the two sampling clocks of FIG. 5 may be employed to sample an input signal 432 that includes a signal at 5600 MHz (in the fifth Nyquist zone). In this example, fifth Nyquist zone folding occurs as a result of each sampling clock signal. Thus, an output centered at 400 MHz (with modulation bandwidth of 30 MHz) will be produced by sampling circuitry 402 due to the clock signal of sampling clock 404a, and a second image at 340 MHz (with no modulation) will also be obtained from sampling circuitry 402 due to the CW clock signal of sampling clock 404b.

It is noted that where sampler outputs are added together to produce a sampling output signal 433, samplers 502a and 502b may be configured in one exemplary embodiment with different gains and to have different magnitude responses before the sampler outputs are added together. In such an embodiment, additional information may be obtained by comparing the different amplitudes of the resultant images in the combined sampling output signal 433 to determine which clock 404a or 404b generated which image in the output signal 433, e.g., the sampling clock 404 of the sampler 502 having the lower gain may be identified as producing the resulting image with the lower amplitude. In one exemplary embodiment, DSP 414 of FIG. 14 (described further herein) may be configured to make this comparison in the quantized digital output from ADC 810. This methodology may be employed, e.g., for images with relatively small modulation that may be more difficult to measure. For example, in yet another illustrative example, sampling clock 404a may be a modulated signal centered at 2000 Msps with a modulation of +/−2 Msps, and the other sampling clock 404b may be a fixed continuous wave (CW) carrier at 2020 Msps. These sample clocks may be employed to sample an input signal 432 that includes a signal at 6550 MHz (in the sixth Nyquist zone). This time, a modulated output centered at 550 MHz (at −28 dBm) will be produced by sampling circuitry 402 due to the clock signal of sampling clock 404a, and a second non-modulated output at 610 MHz (at −36 dBm) will also be obtained from sampling circuitry 402 due to the CW clock signal of sampling clock 404b.

Figure 10:
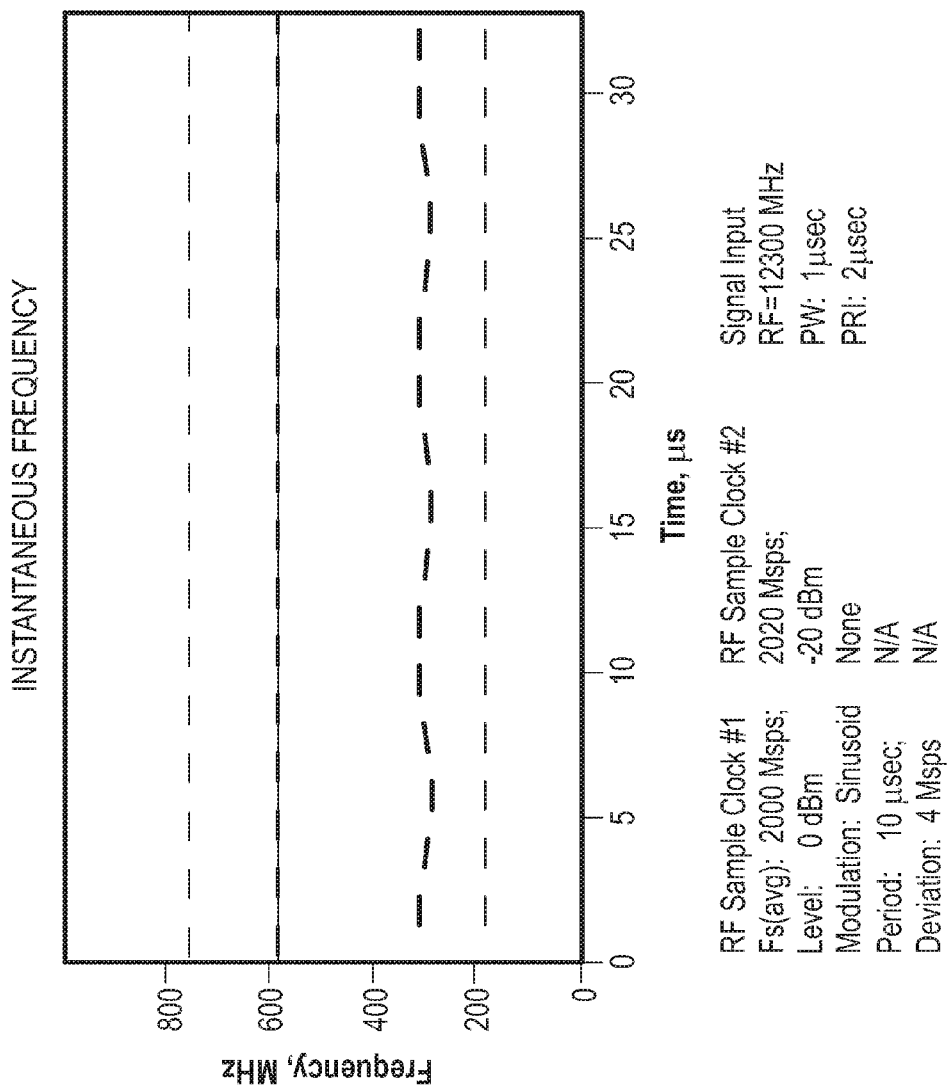
FIG. 10 is a spectrogram according to one exemplary embodiment of the disclosed systems and methods.
Figure 11:
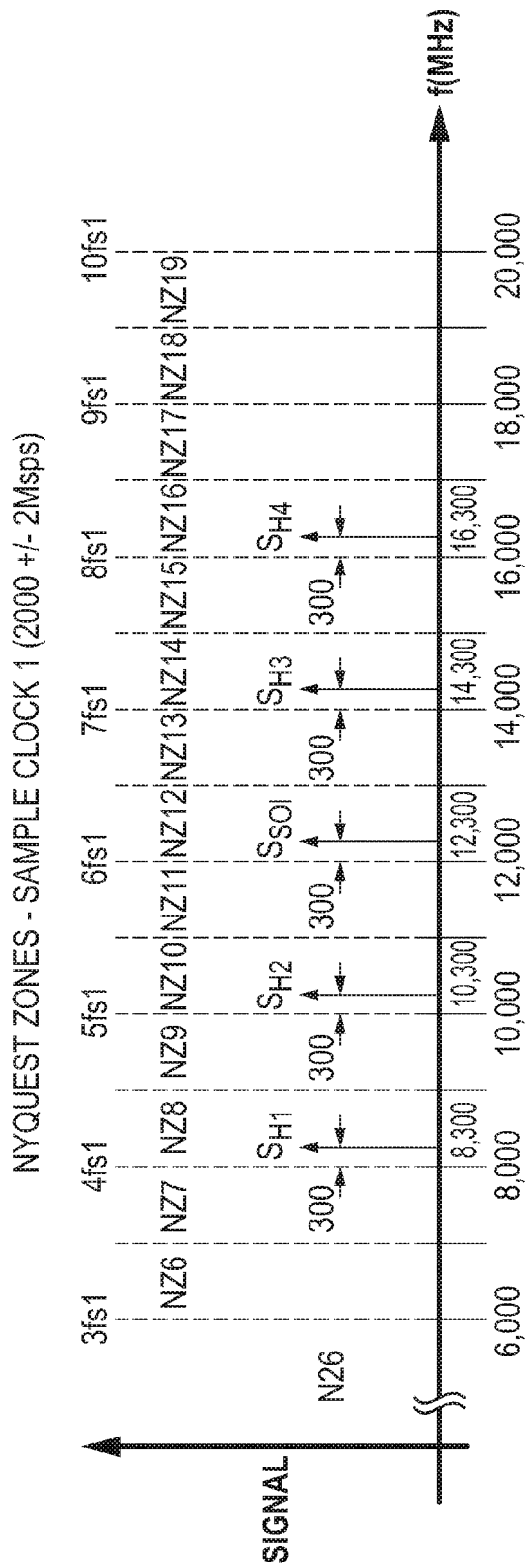
FIG. 11 is a Nyquist zone diagram according to one exemplary embodiment of the disclosed systems and methods.
Figure 12:
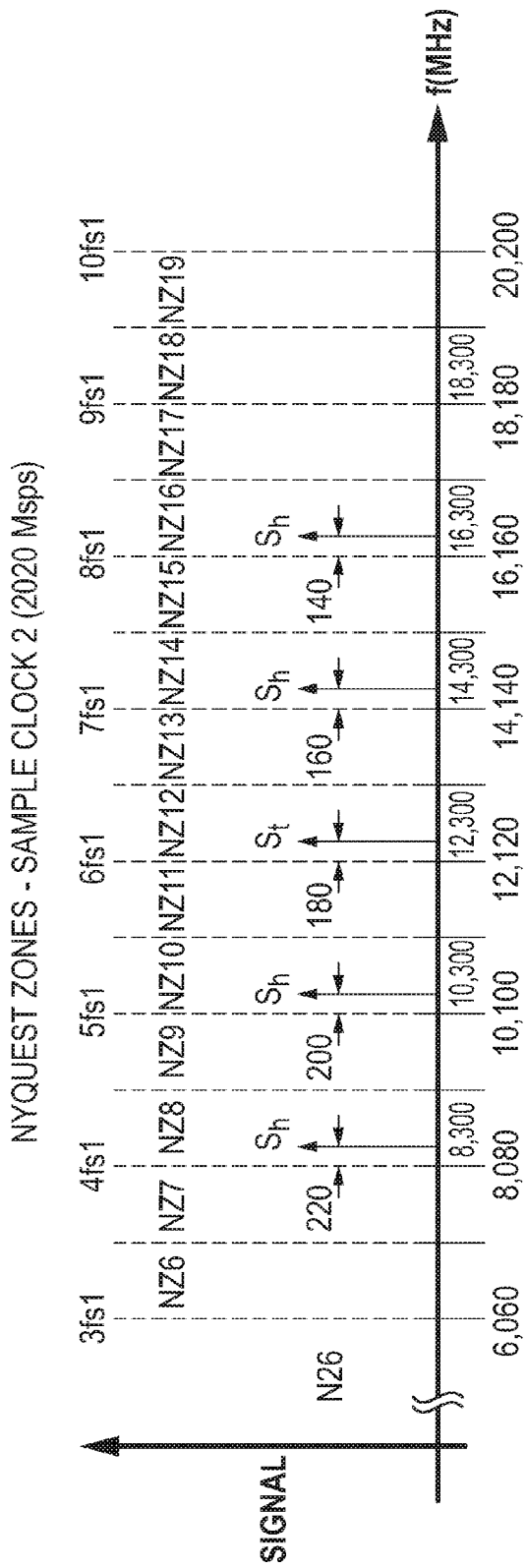
FIG. 12 is a Nyquist zone diagram according to one exemplary embodiment of the disclosed systems and methods.

FIGS. 10-12 illustrate an example in which multiple clock sampling may be implemented to correctly identify the proper Nyquist zone corresponding to a signal of interest under conditions where it may be relatively difficult to determine the induced modulation created by sampling of an input signal using a modulated sampling clock in the manner described above. It is noted that the Nyquist zones in FIGS. 11 and 12 are labeled based upon the assumption that the baseband Nyquist zone from $f_S$ to $f_{S/2}$ is counted as the zero$^{th}$ Nyquist zone. As such, the first Nyquist zone (NZ1) is from $f_{S/2}$ to $f_S$ (not shown), the second Nyquist zone (NZ2) is from $f_S$ to $3f_{S/2}$ (not shown), the third Nyquist zone (NZ3) is from $3f_{S/2}$ to $2f_S$ (not shown), and so on. In this regard, FIGS. 10-12 illustrate the sixth (NZ6) through nineteenth (NZ19) Nyquist zones. Signals in each of the Nyquist zones will be folded on top of each other during sampling, assuming that any input filter of the system allows these Nyquist zones to pass through to the RF sampling circuitry.

In FIG. 10, a RF input 432 including an OOK RF signal of interest having a frequency of 12,300 MHz with a chip duration of 1 µs is sampled using a multi-clock sampling technique according to the disclosed systems and methods. In this example, a first sampling clock 404a produces a modulated sinusoidal sampling clock signal centered at 2000 megasamples per second (Msps) having a period of 10 μs and a deviation of 4 Msps. A second sampling clock 404b produces a continuous wave (CW) sampling clock signal at 2020 Msps.

FIG. 11 illustrates a Nyquist zone diagram for sampled data from the first sampling clock 404a. As may be seen in FIG. 11, the signal of interest ($S_{SOI}$) is located in Nyquist zone 12 (i.e., "NZ12" which extends from 12,000 ($6f_{S1}$) to 13,000 ($13f_{S1}/2$)) and is 300 MHz away from $6f_{S1}$. As may be seen, other hypothetical candidate signals (e.g., $S_{H1}$, $S_{H2}$, $S_{H3}$ and $S_{H4}$) could exist 300 MHz from a nearby harmonic of the sampling clock signal (e.g., in nearby Nyquist zones 8, 10, 14, and 16 that are within two even Nyquist zones on either side of the true Nyquist zone 12 and correspond to RF hypotheses of approximately 8.3, 10.3, 12.3, 14.3, and 16.3 GHz respectively). To identify the sampled signal of interest ($S_{SOI}$) with only the sampled data corresponding to the modulated first sampling clock 404a it is necessary to accurately measure the induced modulation on the folded image at 300 MHz in FIG. 10 in order to determine the Nyquist zone from which $S_{SOI}$ is sampled. However, in this example, without the additional sampled data from the second clock 404b measurement of the induced modulation (i.e., measurement of the slope of the individual on-chips) on the folded image present at 300 MHz in FIG. 10 may be difficult due to relatively small modulation change compared to the resolution of the frequency data measurement for the data sampled based on the first sampling clock 404a that is sampling at 2000+/−2 Msps.

FIG. 12 illustrates a Nyquist zone diagram for sampled data from the second sampling clock 404b which is used to sample the same input data as sampled using the first sample clock 404a, but at a CW of 2020 Msps. The possible signal solutions of FIG. 11 obtained from the sampled data based on the first clock 404a (i.e., $S_{H1}$, $S_{H2}$, $S_{SOI}$, $S_{H3}$ and $S_{H4}$) would correspond to folded frequencies of 220, 200, 180, 160, and 140 MHz, respectively as shown in FIG. 12. However, as previously shown in FIG. 10, the actual folded image corresponding to the second sample clock 404b exists at 180 MHz, which eliminates all hypotheses but 12.3 GHz, which is the correct signal of interest. Therefore, the sampled data based on second sampling clock 404b may be employed to identify the correct Nyquist zone of the signal of interest from the multiple possible Nyquist zones obtained from sampled data obtained using the first sampling clock 404a.

Figure 13:
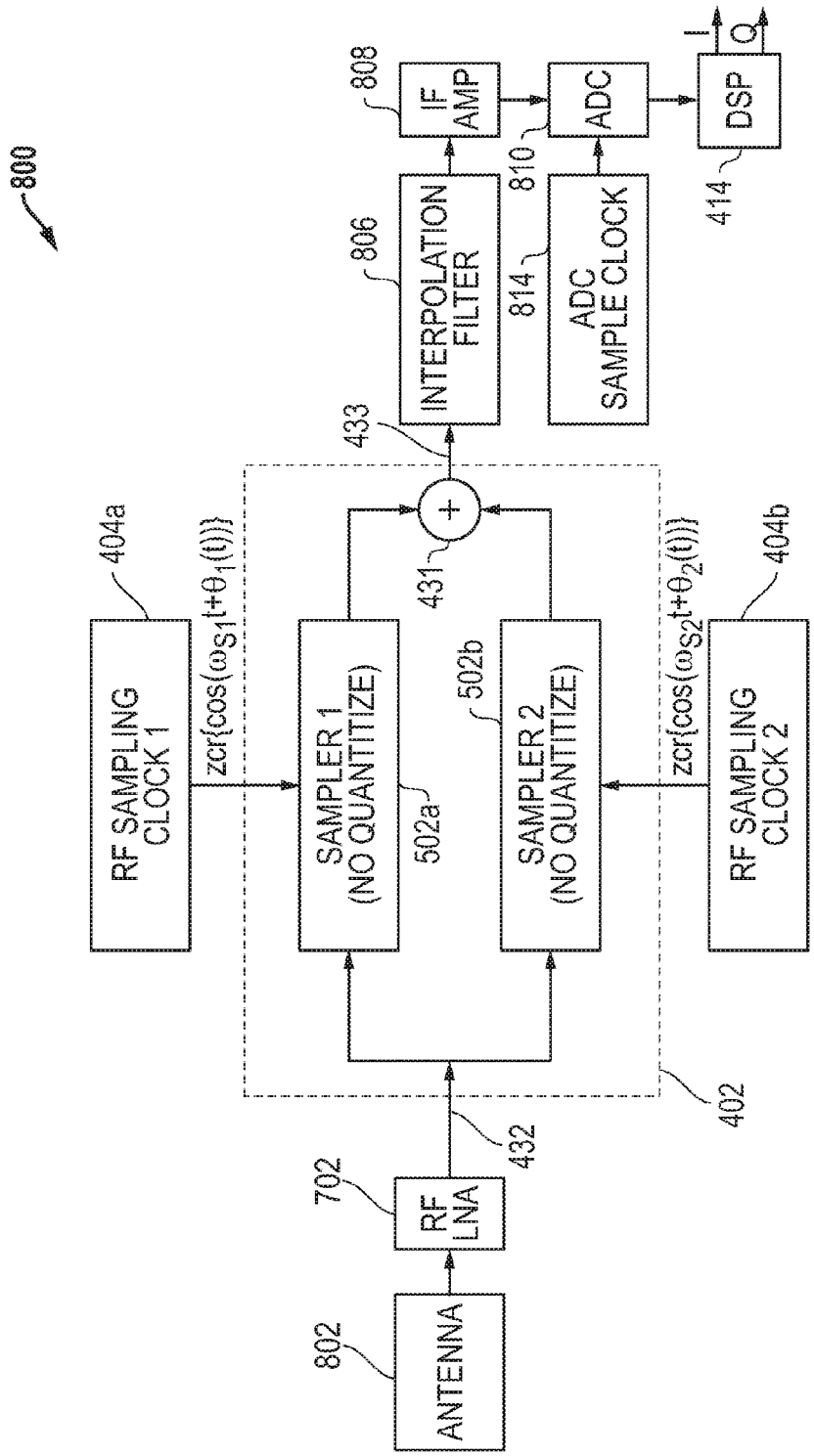
FIG. 13 is a block diagram of a multiple clock RF receiver sampling system architecture according to one exemplary embodiment of the disclosed systems and methods.
Figure 14:
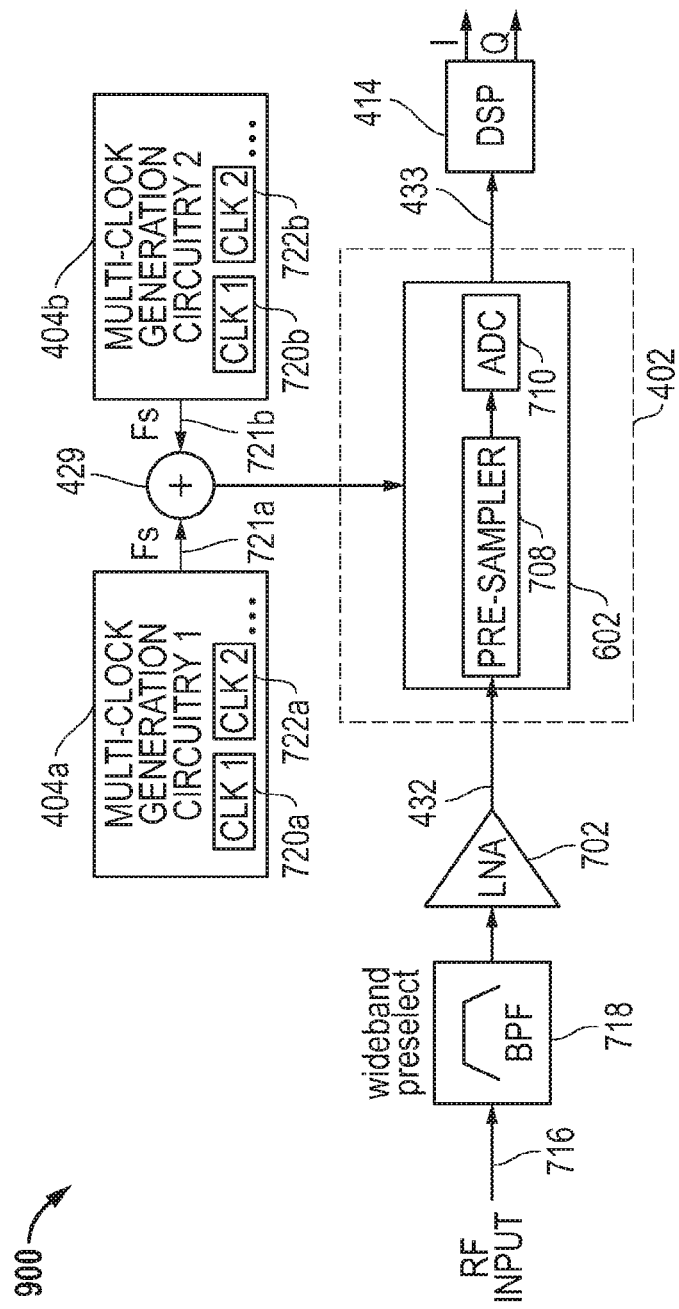
FIG. 14 is a block diagram of a multiple clock RF receiver sampling system architecture according to one exemplary embodiment of the disclosed systems and methods.
Figure 15:
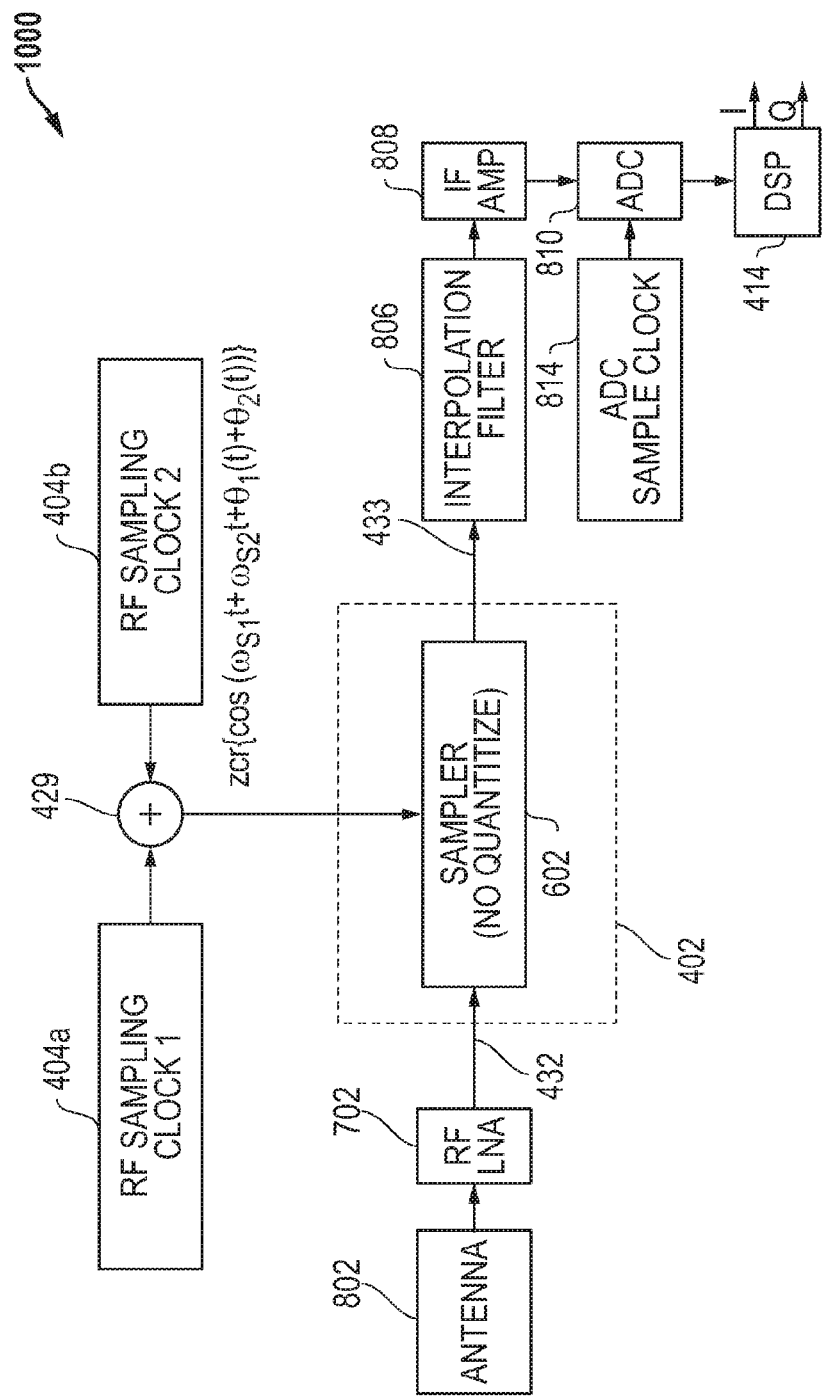
FIG. 15 is a block diagram of a multiple clock RF receiver sampling system architecture according to one exemplary embodiment of the disclosed systems and methods.

FIGS. 13-15 illustrate four exemplary embodiments of sampling receiver architectures with which the disclosed multiple clock RF receiver sampling systems may be implemented. Further example information on the possible structure and operation of one or more individual components that may or may not be present in a given multiple clock RF receiver sampling system embodiment described herein (e.g., possible components such as pre-select BPF 718, LNA 702, DSP 414, analog interpolation filter 806, IF amplifier 808, ADC sampling clock 814, ADC 810, DSP 414, non-quantizing sampler 502, high speed analog pre-sampler 708, ADC circuitry 710, sampling clocks 404 and multi-clock generation sampling clocks 404, etc.), may be found described in U.S. Pat. Nos. 7,436,911 and 7,436,912, each of which is incorporated herein by reference in its entirety. For example, it will be understood that in certain possible embodiments a digital signal processor (DSP) 414 may be configured to receive digital signals from sampling circuitry 402 or ADC 810 (depending on the embodiment) and process these digital signals to identify and remove the Nyquist-zone specific modulation in order to recover the original signal. Thus, DSP circuitry 414 may be configured to remove the induced modulation associated with the Nyquist zone in which the signal was located and to acquire the original signal by utilizing the Nyquist zone in which the signal was located (removing an induced modulation for that Nyquist zone, and acquiring the original signal) as described in the foregoing references.

Moreover, DSP circuitry 414 may be configured to process multiple images generated by a multiple clock RF receiver sampling system described herein to identify different signals from different Nyquist zones based in part upon differences in frequency modulation due to the non-uniform sampling caused by the modulated sampling clock signal from the modulated sampling clock, and based in part upon frequency position of folded images generated by sampling caused by at least one other sampling clock signal from a separate and different one of the multiple sampling clocks. In this regard, DSP circuitry 414 may be configured in one exemplary embodiment to determine frequency positions of multiple possible candidate signals from different candidate Nyquist zones based upon differences in frequency modulation due to the non-uniform sampling of an input signal caused by the modulated sampling clock signal from the modulated sampling clock, and also to determine the hypothetical folded frequencies corresponding to each of the frequency positions of the multiple possible candidate signals that would result by sampling caused by at least one other sampling clock signal from a separate and different one of the multiple sampling clocks. DSP circuitry 414 may then identify the given input signal from the given Nyquist zone as the candidate signal having a hypothetical folded frequency that substantially matches an actual folded frequency that results from sampling of the given input signal caused by at least one other sampling clock signal from a separate and different one of the multiple sampling clocks in a manner described herein in relation to FIGS. 10-12. In one particular exemplary embodiment, DSP circuitry 414 may determine frequency positions of multiple possible candidate signals from different candidate Nyquist zones based upon differences in frequency modulation due to the non-uniform sampling of an input signal caused by the modulated sampling clock signal from the modulated sampling clock, and identify the given input signal from the given Nyquist zone as the candidate signal having a folded frequency that substantially matches the folded frequency that results from sampling of the given input signal caused by at least one other sampling clock signal from a separate and different one of the multiple sampling clocks than the modulated sampling clock.

FIG. 13 illustrates one exemplary embodiment of a multiple clock RF receiver sampling system 800 that is configured as a reconfigurable direct RF bandpass sampling receiver with an analog interpolation filter 806. In this embodiment, the analog interpolation filter allows the ADC clock to be de-coupled, and potentially completely de-coupled, from the RF sample clock. This allows the quantization to be performed at a much slower rate than the initial sampling and allows the final analog bandwidth to be much narrower than the bandwidth of the first stage filter located before the high-speed sampler. The embodiment 800 of FIG. 13 provides a simplified receiver architecture capable of covering extremely large RF ranges (e.g., from less than 2 GHz to greater than 20 GHz) and suitable for a variety of signal applications including wideband RF surveillance and cognitive radio applications. Further, the addition of the narrower analog interpolation filter also allows arbitrarily narrow instantaneous bandwidth for various applications including communications.

The exemplary embodiment of FIG. 13 has been implemented with non-quantizing samplers 502a and 502b in combination with a common analog interpolation filter 806, intermediate frequency (IF) amplifier 808 and ADC 810. Each non-quantizing sampler 502a or 502b receives a respective RF sampling clock signal from a respective RF sample clock 404a or 404b, and the ADC 810 receives a quantization sampling clock signal from ADC sample clock circuitry 814. Because the ADC 810 has been de-coupled from the non-quantizing samplers 404a and 404b through the analog interpolation filter 806, the RF sample clock signals and the ADC sample clock signal may be different. It is noted that RF sample clock circuitry 404a and 404b may also be configured to provide a tunable or selectable RF sample clock, if desired. In this regard, as will be discussed further below with respect to clock circuitry 404a and 404b in FIG. 14, each of the RF sample clock circuitry 404a and 404b of FIG. 13 may generate a clock signal having a tunable frequency or may generate a number of selectable clock signals. In FIGS. 13 and 15, the following variables have been employed to illustrate application in one exemplary embodiment: "zcr" represents zero crossing rising (sine wave), $\omega_{S1}$ is average sample rate for RF sampling clock 1, $\theta_1(t)$ is the phase modulation (pattern) of sampling clock 1, $\omega_{S2}$ is average sample rate for RF sampling clock 2, and $\theta_2(t)$ is the phase modulation (pattern) of sampling clock 2.

As depicted in FIG. 13, the antenna 802 provides an RF input signal to the RF low noise amplifier (RF LNA) 702. This amplified signal is then provided to the non-quantizing samplers 502a and 502b to generate sampled outputs that are added together in adder circuitry 431 and passed through the analog interpolation filter 806, and then digitized with ADC 810. As shown, an additional amplifier 808 may be provided before the ADC 810 which amplifies the output of the analog interpolation filter 806 and is configured to operate at the intermediate frequency (IF) output by the analog interpolation filter 806. The digital output signal 433 from ADC 810 is then further processed by digital signal processing (DSP) circuitry 414 to produce baseband in-phase path (I) and quadrature path (Q) signals. Further description of example suitable Nyquist folded sampling methodology and system components that may be implemented in combination with the multiple simultaneous sampling clock (404a and 404b) embodiment of FIG. 13 illustrated herein may be found in U.S. Pat. Nos. 7,436,911 and 7,436,912, each of which is incorporated herein by reference in its entirety.

FIG. 14 illustrates one exemplary embodiment of a multiple clock reconfigurable direct radio frequency (RF) sampling receiver 900 that may be implemented to provide direct RF sampling of a wideband input signal spectrum which is sampled at far below the conventional Nyquist rate given the bandwidth of the total frequency range of interest. As shown in FIG. 14, a radio frequency (RF) input signal 716 is first passed through a wideband pre-select bandpass filter (BPF) 718 and then to a low noise amplifier (LNA) 702. The output of the LNA 702 is provided as signal 432 to the sampling circuitry 402, which in this embodiment includes a common sampler 602. As shown in FIG. 14, simultaneously-provided clock sample times from each of sampling clocks 404a and 404b are added together by adder 429 and provided to the common sampler 602 of sampling circuitry 402, which samples data from RF input 432 according to the combined clock signals from sampling clocks 404a and 404b to generate an output signal 433 that includes at least two images for further processing. In this regard, respective sampling clock (Fs) input signals 721a are 721b may be provided at a desired sampling frequency, e.g., such as described above in relation to FIGS. 8-12. As further shown, sampler 602 may include a respective high speed analog pre-sampler 708 and analog-to-digital converter (ADC) circuitry 710. The digital output signal 433 from sampling circuitry 402 is then further processed by digital signal processing (DSP) circuitry 414 to produce baseband in-phase path (I) and quadrature path (Q) signals.

In the particular exemplary embodiment of FIG. 13, each sampling clock (Fs) input signals 721a and 721b may be generated by multi-clock generation circuitry of a respective sampling clock 404a or 404b. As depicted, the multi-clock generation circuitry of each sampling clock 404a or 404b generates two or more clock signals that can be selected and used as sampling clocks (CLK1, CLK2 . . . ) for the respective sampling clock signal 721a or 721b that is provided to a respective sampler 502a or 502b of sampling circuitry 402. As shown, two or more clock signals can be generated by the multi-clock generation circuitry of each sampling clock 404a or 404b, namely, a first clock signal (CLK1) 720a or 720b, a second clock signal (CLK2) 722a or 722b, and any number of additional clock signals, as desired. Implementation of multi-clock generation circuitry and selection of which of the clock signals of the multi-clock generation of each sampling clock 404a and 404b may be performed for example as described in U.S. Pat. Nos. 7,436,911 and 7,436,912, each of which is incorporated herein by reference in its entirety.

In some embodiments a single clock signal for each sampler 502a or 502b may be utilized, if desired. In such an implementation, the clock generation circuitry of each sampling clock 404a or 404b may provide a single fixed sampling clock output signal for its respective sampler 502a or 502b. Provision for different clock signals allow for selection of an appropriate sampling clock based on meeting the Nyquist criteria of the bandpass filter and based on criteria so as to avoid Nyquist sampling problems due to Nyquist boundaries. Nyquist zones are determined by the sampling rate for the sampling circuitry 106, and Nyquist criteria locate sampling zone boundaries at integer (K=0, 1, 2, 3 . . . ) multiples of $f_S/2$ starting at DC (frequency=0 Hz). In addition, Nyquist zones alternate between non-inverted and inverted spectrums. Traditional Nyquist criteria states that for bandpass sampling, the sampling rate must be two-times or greater than the bandwidth of the signal frequency range of interest, and that for baseband sampling, the sampling rate must be two-times or greater than the maximum frequency for the signal frequency range of interest. Further description of example suitable Nyquist folded sampling methodology and system components that may be implemented in combination with the multi-sampling clock embodiment of FIG. 14 may be found in U.S. Pat. Nos. 7,436,911 and 7,436,912, each of which is incorporated herein by reference in its entirety.

FIG. 15 illustrates an exemplary embodiment of multiple clock RF receiver sampling system 1000 that corresponds to the embodiment of FIG. 13. However, in FIG. 15, simultaneously-provided clock sample times from each of sampling clocks 404a and 404b are added together by adder circuitry 429 and provided to common sampler 602 of sampling circuitry 402, which samples data from RF input 432 according to the combined clock signals from sampling clocks 404a and 404b to generate an output signal 433 that includes at least two images for further processing in the manner described for the embodiment of FIG. 13.

It will be understood that FIGS. 13-15 illustrate just three possible exemplary embodiments of particular multiple clock RF receiver sampling systems, and that the disclosed multiple clock RF receiver sampling system architecture may be implemented with any other RF receiver sampling system architecture for producing multiple simultaneously-sampled images. For example, other Nyquist folded bandpass sampling receiver architectures that may be modified to use the multiple sampling clock methodology described herein may be found described in relation to FIGS. 3, 4, 7, 8, 9A, 9B and 10A of U.S. Pat. Nos. 7,436,911 and 7,436,912, each of which is incorporated herein by reference in its entirety. Thus, the disclosed systems and methods may employ other optional features in addition and/or alternative to the features of FIGS. 13-15, including, but not limited to, a switchable chirped sampling clock signal and a fixed low-pass interpolation filter, a wideband front end filter without an analog interpolation filter to de-couple the RF sampling clock and the quantization clock, an ultra wideband (UWB) front end filter in combination with a narrow band (NB) filter to improve reception of ultra wideband signals, modulated and possibly tunable sampling clock, tunable and modulated sampling clock, use of an injected pilot tone in order to facilitate the recovery of the modulated sample clock, processing Nyquist folded data through a delay path a sampling clock detection path that provides the detected sampling clock back to the delayed path, use of an electronic synchronization circuit to accurately synchronize the RF sampling clock modulation with associated time stamping or referencing to the RF input data combinations thereof, etc.

It will be understood that one or more of the tasks, functions, or methodologies described herein (e.g., such as performed by DSP 414) may be implemented, for example, as firmware or other computer program of instructions embodied in a non-transitory tangible computer readable medium that is executed by a CPU, controller, microcontroller, processor, microprocessor, FPGA, ASIC, or other suitable processing device.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. Receive path circuitry for a sampling receiver having folded Nyquist zones, comprising:
   multiple sampling clocks that are each configured to produce a respective sampling clock signal, at least one of the multiple sampling clocks being a modulated sampling clock configured to produce a modulated sampling clock signal that has a center frequency that is different from the center frequency of a sampling clock signal produced by at least one other of the multiple sampling clocks;
   sampling circuitry having a sampling circuit input configured to receive input signals within a bandwidth wide enough to cover multiple Nyquist zones associated with the modulated sampling clock, the sampling circuitry configured to receive the input signals and to receive each of the sampling clock signals from the multiple sampling clocks, each of the sampling clock signals being configured to provide sampling for the input signals within the multiple Nyquist zones to produce a separate and different image corresponding to each input signal, and the modulated sampling clock signal being configured to provide non-uniform sampling for signals within the multiple Nyquist zones to induce frequency modulation on signals dependent on a Nyquist zone of origin; and
   a sampling circuitry output configured to produce a sampling circuitry output signal that includes the multiple different images generated by sampling each input signal using each of the multiple sampling clock signals, the multiple different images including at least one first image and at least one second image corresponding to each input signal.

2. The receive path circuitry of claim 1, where the sampling circuitry comprises:
   a first sampler coupled to receive the input signals from the sampling circuitry input and coupled to receive a first sampling clock signal from a first one of the multiple sampling clocks, the first sampler configured to output a first image produced by sampling each of the input signals with the first sampling clock;
   a second sampler coupled to receive the input signals from the sampling circuitry input and coupled to receive a second sampling clock signal from a second one of the multiple sampling clocks, the second sampler configured to output a second image produced by sampling each of the input signals with the second sampling clock; and
   adder circuitry configured to combine the first sampler output with the second sampler output to produce the sampling circuitry output signal.

3. The receive path circuitry of claim 2, where the first and second samplers are configured to sample with different gain levels so as to produce the respective first and second images with different amplitudes from each other; and where the receive path circuitry further comprises digital signal processing circuitry coupled to receive the output from the sampling circuitry and configured to compare the amplitude of the respective first and second images with each other to determine which of the first and second samplers and their respective sampling clocks produced at least one of the respective first and second images.

4. The receive path circuitry of claim 2, where the first sampling clock is a modulated sampling clock and the first sampler is configured to use the first sampling clock to produce a modulated first image corresponding to each input signal; where the second sampling clock is a fixed continuous wave (CW) carrier and the second sampler is configured to use the second sampling clock to produce a CW second image corresponding to each input signal; and where the sampling circuitry output signal includes the first modulated image corresponding to each input signal and the second CW image corresponding to each input signal.

5. The receive path circuitry of claim 1, further comprising:
   a first sampling clock configured to produce a first sampling clock signal; and
   a second sampling clock configured to produce a second sampling clock signal; and
   where the sampling circuitry comprises:
      adder circuitry coupled to receive the first and second clock signals and configured to combine the first sampling clock signal with the second clock signal to produce a combined sampling clock signal, and
      a common sampler coupled to receive the combined sampling clock signal, the sampler configured to output first and second images produced by sampling each of the input signals with the combined sampling clock signal, the first image corresponding to the first sampling clock signal and the second image corresponding to the second clock signal.

6. The receive path circuitry of claim 1, where the modulated sampling clock signal comprises a frequency modulated clock signal.

7. The receive path circuitry of claim 6, where the frequency modulated clock signal comprises a linear sawtooth modulation, a sinusoidal modulation, a triangle modulation, a frequency shift key modulation, a frequency agile modulation, a communications frequency modulation, a phase shift key modulation, or a combination thereof.

8. The receive path circuitry of claim 1, further comprising wideband filter circuitry having a center frequency within a frequency range of interest and having a bandwidth less than or equal to the frequency range of interest and wide enough to cover multiple Nyquist zones associated with multiple sampling clocks, the wideband filter circuitry being configured to provide a filtered signal as the input signal to the sampling circuitry input.

9. The receive path circuitry of claim 1, where the sampling circuitry comprises non-quantizing sampling circuitry; and where the receive path circuitry further comprises:
an analog interpolation filter coupled to receive the output of the non-quantizing sampling circuitry, the analog interpolation filter having a center frequency within a Nyquist zone of operation for the non-quantizing sampling circuitry; and
analog to digital converter (ADC) circuitry configured to receive a quantization sampling clock signal and to quantize an analog signal received from the analog interpolation filter.

10. The receive path circuitry of claim 9, wherein the modulated clock signal comprises a frequency modulated clock signal.

11. The receive path circuitry of claim 1, further comprising digital signal processing circuitry coupled to receive the output from the sampling circuitry and configured to identify different signals from different Nyquist zones based in part upon differences in frequency modulation due to the non-uniform sampling caused by the modulated sampling clock signal from the modulated sampling clock, and based in part upon frequency position of folded images generated by sampling caused by at least one other sampling clock signal from a separate and different one of the multiple sampling clocks.

12. The receive path circuitry of claim 11, where the digital signal processing circuitry is configured to identify a given input signal from a given Nyquist zone by:
determining frequency positions of multiple possible candidate signals from different candidate Nyquist zones based upon differences in frequency modulation due to the non-uniform sampling of an input signal caused by the modulated sampling clock signal from the modulated sampling clock;
determining the hypothetical folded frequencies corresponding to each of the frequency positions of the multiple possible candidate signals that would result by sampling caused by at least one other sampling clock signal from a separate and different one of the multiple sampling clocks;
identifying the given input signal from the given Nyquist zone as the candidate signal having a hypothetical folded frequency that substantially matches an actual folded frequency that results from sampling of the given input signal caused by at least one other sampling clock signal from a separate and different one of the multiple sampling clocks.

13. The receive path circuitry of claim 11, where the digital signal processing circuitry is configured to identify a given input signal from a given Nyquist zone by:
determining frequency positions of multiple possible candidate signals from different candidate Nyquist zones based upon differences in frequency modulation due to the non-uniform sampling of an input signal caused by the modulated sampling clock signal from the modulated sampling clock;
identifying the given input signal from the given Nyquist zone as the candidate signal having a folded frequency that substantially matches the folded frequency that results from sampling of the given input signal caused by at least one other sampling clock signal from a separate and different one of the multiple sampling clocks.

14. A method for bandpass sampling of signals using folded Nyquist zones, comprising:
providing sampling circuitry;
generating multiple sampling clock signals for sampling within the multiple Nyquist zones, at least one of the generated multiple sampling clock signals being a modulated sampling clock signal that has a center frequency that is different from the center frequency of another one of the generated sampling clock signals;
utilizing sampling circuitry to sample input signals within the multiple Nyquist zones with each of the sampling clock signals to produce multiple different images corresponding to each of the input signals, the modulated sampling clock providing non-uniform sampling for signals within the multiple Nyquist zones to induce frequency modulation on the signals dependent on a Nyquist zone of origin; and
producing an output signal from the sampling circuitry that includes the multiple different images generated by sampling each of the input signals using each of the multiple sampling clock signals, the multiple different images including at least one first image and at least one second image corresponding to each input signal.

15. The method of claim 14, further comprising:
generating a first sampling clock signal and sampling the input signals using the first sampling clock signal to produce a first image corresponding to each input signal with the first sampling clock;
generating a second sampling clock signal and sampling the input signals using the second sampling clock signal to produce a second image corresponding to each input signal with the second sampling clock; and
combining the first image with the second image to produce the output signal from the sampling circuitry.

16. The method of claim 15, further comprising using a gain level to sample the input signals with the first sampling clock signal that is different than the gain level used to sample the input signals with the second sampling clock signal so as to produce the respective first and second images with different amplitudes from each other; and comparing the amplitude of the respective first and second images in the output signal from the sampling circuitry to determine which of the first and second samplers and their respective sampling clocks produced at least one of the respective first and second images.

17. The method of claim 15, where the first sampling clock is a modulated sampling clock and the second sampling clock is a fixed continuous wave (CW) carrier; and where the method further comprises:
using the first sampling clock to produce the first image as a modulated first image corresponding to the input signal; and using the second sampling clock to produce the second image as a CW second image corresponding to the input signal.

18. The method of claim 14, further comprising:
generating a first sampling clock signal;
generating a second sampling clock signal;
combining the first sampling clock signal with the second clock signal to produce a combined sampling clock signal; and
sampling the input signals with the combined sampling clock signal to produce a first image corresponding to each given input signal sampled by the first sampling clock signal, and to produce a second image corresponding to each input signal produce sampled by the second clock signal.

19. The method of claim 14, wherein the generating step comprises generating a frequency modulated clock signal for the modulated sampling clock signal.

20. The method of claim 19, further comprising modulating the modulated sampling clock signal with a linear sawtooth modulation, a sinusoidal modulation, a triangle modulation, a frequency shift key modulation, a frequency agile modulation, a communications frequency modulation, a phase shift key modulation, or a combination thereof.

21. The method of claim 14, further comprises:
filtering a RF input to produce a filtered signal including the input signals by utilizing wideband filter circuitry having a center frequency within a frequency range of interest and having a bandwidth less than or equal to the frequency range of interest and wide enough to cover multiple Nyquist zones associated with the multiple sampling clocks; and
where the step of utilizing sampling circuitry to sample the input signals within the multiple Nyquist zones further comprises utilizing the sampling circuitry to sample the input signals in the produced filtered signal.

22. The method of claim 14, where the step of utilizing sampling circuitry to sample the input signals within the multiple Nyquist zones further comprises sampling the input signals without quantizing the signal; and where the method further comprises:
filtering the output signal from the sampling circuitry with an analog interpolation filter having a center frequency within a Nyquist zone; and
quantizing a signal received from the analog interpolation filter.

23. The method of claim 22, where the modulated sampling clock signal comprises a frequency modulated sampling clock signal.

24. The method of claim 14, further comprising identifying different signals from different Nyquist zones based in part upon differences in frequency modulation due to the non-uniform sampling caused by the modulated sampling clock signal from the modulated sampling clock, and based in part upon frequency position of folded images generated by sampling caused by at least one other sampling clock signal from a separate and different one of the multiple sampling clocks.

25. The method of claim 24, further comprising identifying a given input signal from a given Nyquist zone by:
determining frequency positions of multiple possible candidate signals from different candidate Nyquist zones based upon differences in frequency modulation due to the non-uniform sampling of an input signal caused by the modulated sampling clock signal from the modulated sampling clock;
determining the hypothetical folded frequencies corresponding to each of the frequency positions of the multiple possible candidate signals that would result by sampling caused by at least one other sampling clock signal from a separate and different one of the multiple sampling clocks; and
identifying the given input signal from the given Nyquist zone as the candidate signal having a hypothetical folded frequency that substantially matches an actual folded frequency that results from sampling of the given input signal caused by at least one other sampling clock signal from a separate and different one of the multiple sampling clocks.

26. The receive path circuitry of claim 24, further comprising identifying a given input signal from a given Nyquist zone by:
determining frequency positions of multiple possible candidate signals from different candidate Nyquist zones based upon differences in frequency modulation due to the non-uniform sampling of an input signal caused by the modulated sampling clock signal from the modulated sampling clock; and
identifying the given input signal from the given Nyquist zone as the candidate signal having a folded frequency that substantially matches the folded frequency that results from sampling of the given input signal caused by at least one other sampling clock signal from a separate and different one of the multiple sampling clocks.

* * * * *